US007076729B2

(12) United States Patent
Mani et al.

(10) Patent No.: US 7,076,729 B2
(45) Date of Patent: Jul. 11, 2006

(54) GRAPHICAL SPECIFICATION OF XML TO XML TRANSFORMATION RULES

(75) Inventors: Ravi Mani, Westmont, IL (US); Joerg Meyer, San Jose, CA (US); Pratibha Jamdagneya Sharma, Milpitas, CA (US); Hovey Raymond Strong, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 658 days.

(21) Appl. No.: 10/142,616

(22) Filed: May 9, 2002

(65) Prior Publication Data

US 2003/0212698 A1    Nov. 13, 2003

(51) Int. Cl.
*G06F 15/00* (2006.01)

(52) U.S. Cl. ...................... 715/513; 715/517
(58) Field of Classification Search ............. 715/762, 715/805, 513, 531, 517, 523, 530
See application file for complete search history.

(56) References Cited

U.S. PATENT DOCUMENTS

| | | | | |
|---|---|---|---|---|
| 6,253,366 B1 * | 6/2001 | Mutschler, III | ............. | 717/104 |
| 6,330,569 B1 | 12/2001 | Baisley et al. | ............. | 717/104 |
| 6,342,907 B1 * | 1/2002 | Petty et al. | ................. | 715/762 |
| 6,882,995 B1 * | 4/2005 | Nasr et al. | ..................... | 707/3 |
| 2003/0167445 A1 * | 9/2003 | Su et al. | ..................... | 715/513 |
| 2004/0205452 A1 * | 10/2004 | Fitzsimons et al. | ......... | 715/500 |
| 2004/0205549 A1 * | 10/2004 | Yassin et al. | ............... | 715/513 |

* cited by examiner

*Primary Examiner*—Kyle R. Stork
*Assistant Examiner*—Londra C Burge
(74) *Attorney, Agent, or Firm*—John Biggers; David A. Mims, Jr.; Biggers & Ohanian, LLP

(57) ABSTRACT

Graphical specification of an XML to XML transformation rule, including receiving a user's selection of a user-selected, optionally ambiguous, target leaf node, from a target tree of an initial target context, the target leaf node representing a target XML element to be mapped by the transformation rule; if the target leaf node is ambiguous, disambiguating the target leaf node; and adding the target leaf node to the transformation rule. Embodiments typically include receiving a user's selection of at least one user-selected, optionally ambiguous, source leaf node, from a source tree of an initial source context, wherein the source leaf node represents a source XML element to be mapped to the target leaf node by the transformation rule; if the source leaf node is ambiguous, disambiguating the source leaf node; and adding the user-selected source leaf node to the transformation rule.

21 Claims, 13 Drawing Sheets

GRAPHICAL SPECIFICATION OF XML TO XML TRANSFORMATION RULES

BACKGROUND OF THE INVENTION

1. Field of the Invention

The field of the invention is data processing, or, more specifically, methods, systems, and products for graphical specification of XML to XML transformation rules.

2. Description of Related Art

XML is the Extensible Markup Language. XML is designed to provide flexible and adaptable information formatting and identification. XML is called extensible because it has no fixed format like HTML, the Hypertext Markup Language, which is a set of predefined markups. Instead, XML is actually a 'metalanguage'—a language for describing other languages—which allows users to design customized markup languages for many different types of documents.

XML's principal purpose is structuring data. Structured data includes things like spreadsheets, address books, configuration parameters, financial transactions, and technical drawings. XML includes a set of rules for designing text formats that support structuring data.

Like HTML, XML makes use of elements, tags, and attributes. Elements are content segements identified by tags. Elements have possibly empty values, the value of an instance of an element being the string between the beginning and ending tags for the instance of the element. 'Tags' are words bracketed by '<' and '>,' and attributes are defined characteristics of elements having for example the form: AttributeName="value". While HTML specifies what each tag and attribute means, and often how the text between them will look in a browser, XML uses the tags only to delimit pieces of data, and leaves the interpretation of the data completely to the application that reads it. In other words, although in the predefined syntax of HTML, "<p>" means 'paragraph,' "<p>" in an XML file means whatever the reading application says it means. Depending on the context, it may be a price, a parameter, a person, or in many cases it represents an entity having nothing to do with Ps.

The formal relations among elements and attributes in XML documents are governed by declarations set forth in Document Type Definitions or 'DTDs.' A DTD is a formal description in XML Declaration Syntax of a particular type of XML document. The governing DTD for a particular XML document sets out what names are to be used for the different types of element, where they may occur, and how they all fit together. For example, in a document type describing Lists which contain Items, the relevant part of the governing DTD may contain:

<!ELEMENT List (Item)+>
<!ELEMENT Item (#PCDATA)>

These declarations define a List as an element containing one or more Items (the plus sign means one or more). These declarations also define Items as elements containing plain text (Parsed Character Data or 'PCDATA'). Validating parsers read the DTD before reading documents governed by the DTD so that the parsers can identify where every element ought to occur and how each relates to the others, so that applications which need to know this in advance (for example, editors, search engines, navigators, and databases) can set themselves up correctly. The example declarations above supports creation of lists in XML like this example snippet:

<List>
<Item>Chocolate</Item>
<Item>Music</Item>
<Item>Surfing</Item>
</List>

There are three instances of the element named 'Item' in the above example snippet of XML, having values respectively of "Chocolate," "Music," and "Surfing."

How such a list appears in print or on a computer screen depends on an additional document or file called a stylesheet. Unlike HTML, there are no display formatting elements in XML itself. Placing all display formatting in separate files means that display appearance can be changed for all compliant XML documents with no need to edit the XML documents themselves.

There are thousands of DTDs already in existence for many subjects. Many of them can be downloaded and used freely, or users can develop their own DTDs using the XML Declaration Syntax. In fact, it is the growing ubiquity and power of XML and its governing DTDs that creates challenges for users.

XML is not a programming language as such; it is a markup standard for structuring data. There is no need for users to be programmers in order to use XML. On the other hand, DTDs are becoming more widespread, and many DTDs are becoming large and complex. In addition, as more and more data structures, databases, and document types are implemented in XML documents whose structures are governed by DTDs, there is more and more demand for conversion among different structures.

Consider an example of an Internet sales company who purchases a large vendor database from a supplier. The sales company wishes to integrate the vendor database into its sales database. Many of the fields in the two databases map one-to-one, vendor name, vendor street address, city, state, zip code, and so on. Many of them, however, do not. And even the one that do map one-to-one have different field names in the two databases. The sales database's name field is called CustomerName; the vendor databases's name field is called VendorName; and so on.

In addition, many desirable conversions are extremely complex: The sales company maintains statistical totals of customers in several categories or even in several different types of categories. The vendor database contains fields that can be mapped into the sales databases's category fields, but in order to effect this mapping, running totals must be created for many vendor database fields to map into a single sales database category field at conversion time.

In this example, the vendor database, the source, is expressed in a source XML document governed by a source DTD, and the sales database, the target, is capable of importing data expressed in a target XML governed by a target DTD. The target DTD exists, defining the data structures recognizable by the import function of the target database. The challenge is how to created the target XML document from the source XML document. That is, the challenge is how to convert the data expressed in a source data format conforming with a source DTD into a target format that conforms to a different DTD, the target DTD.

In prior art, although the personnel that developed the XML documents were not required to be programmers, the personnel that write the translation routines, the translation rules for mapping or converting data from the source database to the target database, must not only be programmers, they must be programmers skilled in XML, XML Declaration Syntax, and some special purpose transformation language like XSL for example. And they must be numerous programmers. It would be very advantageous, therefore, it there were means and methods to enable non-programmers, less skilled programmers, or fewer programmers, to establish translation rules for converting a source XML document to a target XML document when the two XML documents have data structures defined and governed by two different DTDs.

SUMMARY OF THE INVENTION

Exemplary embodiments of the invention comprise methods for graphical specification of XML to XML transformation rules. Exemplary embodiments typically include receiving a user's selection of a user-selected, optionally ambiguous, target leaf node, from a target tree of an initial target context, the target leaf node representing at least one instance of a target XML element to be mapped by the transformation rule. Such embodiments typically include disambiguating the target leaf node, when the target leaf node is ambiguous. Such embodiments typically include adding the target leaf node to the transformation rule, and receiving a user's selection of at least one user-selected, optionally ambiguous, source leaf node, from a source tree of an initial source context, in which the source leaf node represents a source XML element to be mapped to the target leaf node by the transformation rule. Typical embodiments include disambiguating the source leaf node, when the source leaf node is ambiguous, and adding the user-selected source leaf node to the transformation rule.

In exemplary embodiments of the invention, when the source leaf node is ambiguous, disambiguating the source leaf node typically includes creating a new source context for the selected source leaf node, and adding to the new source context and to the transformation rule a user-specified selection criterion for the first source node, wherein the selection criterion for the first source node optionally recursively includes one or more additional ambiguous source nodes. In such embodiments, disambiguating the source leaf node also includes recursively creating new contexts for the additional ambiguous source nodes, and recursively adding to the additional new contexts and the transformation rule user specified selection criteria for the additional ambiguous source nodes.

In exemplary embodiments of the invention, when the target leaf node is ambiguous, receiving a user's selection of the target leaf node typically includes receiving a user's selection of the target leaf node, from a target tree of an initial target context, in which the target leaf node represents a target XML element to be mapped by the transformation rule, the target tree having a root, the target leaf node having a path from the root to the target leaf node excluding the target leaf node itself, in which the path includes one or more repeating nodes. In such embodiments, disambiguating the target leaf node typically includes creating a new context for each repeating node in the tree path between the root and the target leaf node, adding, to each new context and to the transformation rule, for each repeating node in the tree path between the root and the target leaf node, a user-specified indication whether each such repeating node represents an XML element mapped with multiple instances, and adding, to each new context and to the transformation rule, a user-selected repeating source node for each repeating node in the tree path between the root and the target leaf node that represents an XML element mapped with multiple instances.

In exemplary embodiments of the invention, when the target leaf node is ambiguous, receiving a user's selection of the target leaf node typically includes receiving a user's selection of the target leaf node, from a target tree of an initial target context, the target leaf node representing a target XML element to be mapped by the transformation rule, the target tree having a root, the target leaf node having a path from the root to the target leaf node excluding the target leaf node itself, in which the path includes one or more repeating nodes. In such embodiments, disambiguating the target leaf node typically includes selecting, from among previously-created contexts, a selected context for at least one repeating node in the tree path between the root and the target leaf node, and adding, to each selected context and to the transformation rule, for the at least one repeating node in the tree path between the root and the target leaf node, a user-specified indication whether each such repeating node represents an XML element mapped with multiple instances. Such embodiments typically include adding, to each selected context and to the transformation rule, a user-selected repeating source node for the at least one repeating node, when the at least one repeating node represents an XML element mapped with multiple instances.

Exemplary embodiments of the invention typically include methods for graphical specification of an XML to XML transformation rule. Exemplary embodiments typically include receiving a user's selection of a user-selected, ambiguous, target leaf node, from a target tree of an initial target context, the target leaf node representing a target XML element to be mapped by the transformation rule, the target tree having a root, the target leaf node having a path from the root to the target leaf node including the target leaf node itself, in which the path includes one or more repeating nodes. Some embodiments typically include disambiguating the target leaf node. Such embodiments typically include creating a new context for each repeating node in the tree path between the root and the target leaf node, and adding, to each new context and to the transformation rule, for each repeating node in the tree path between the root and the target leaf node, a user-specified indication whether each such repeating node represents an XML element mapped with multiple instances. Such embodiments typically include adding, to each new context and to the transformation rule, a user-selected repeating source node for each repeating node in the tree path between the root and the target leaf node that represents an XML element mapped with multiple instances, and adding the target leaf node to the transformation rule.

In exemplary embodiments of the invention, disambiguating the target leaf node typically includes selecting, from among previously-created contexts, a selected context for at least one repeating node in the tree path between the root and the target leaf node, and adding, to the selected context and to the transformation rule, for the at least one repeating node in the tree path between the root and the target leaf node, a user-specified indication whether each such repeating node represents an XML element mapped with multiple instances. Such embodiments typically include adding, to the selected context and to the transformation rule, a user-selected repeating source node for the at least one repeating node, when the at least one repeating node represents an XML element mapped with multiple instances.

In exemplary embodiments of the invention, at least one of the user-selected repeating source nodes is an ambiguous repeating source node having at least one repeating ancestor node. In such embodiments, adding a user-selected repeating source node for each repeating node in the tree path typically includes creating a new source context for the selected source leaf node, and adding, to the new source context and to the transformation rule, a user-specified selection criterion for the first source node, in which the selection criterion for the first source node optionally recursively includes one or more additional ambiguous source nodes. Such embodiments typically include recursively creating additional new contexts for the additional ambiguous source nodes, and recursively adding, to the additional new contexts and to the transformation rule, user-specified selection criteria for the additional ambiguous source nodes.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

Figure 1A:
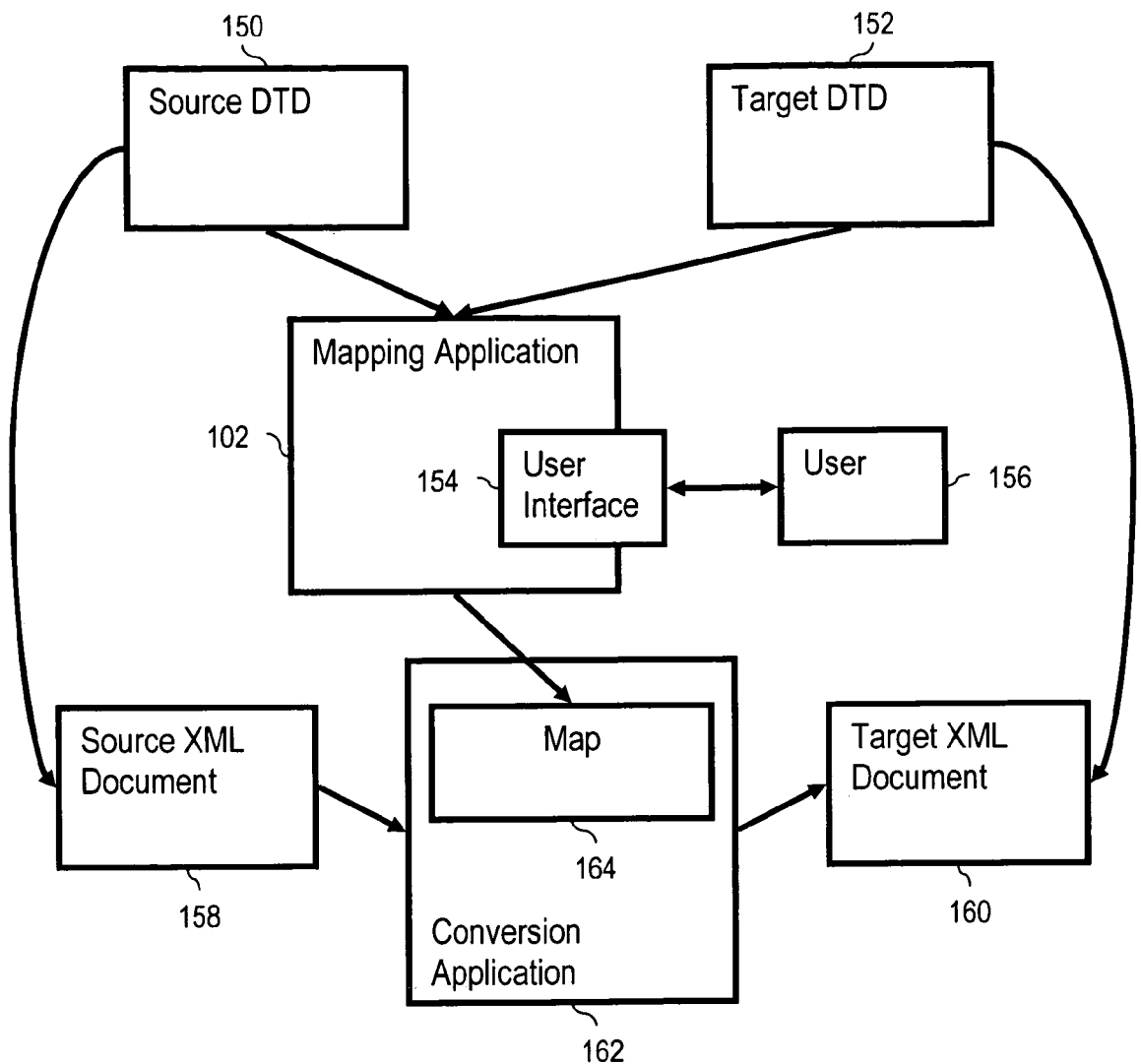
FIG. 1a is a block diagram of the overall structure of typical exemplary embodiments of the present invention.

The present invention is described to a large extent in this specification in terms of methods for graphical specification of XML to XML transformation rules. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Pseudocode Examples

In the following pseudocode examples, terms beginning with an upper case letter denote classes; terms beginning with a lower case letter denote individuals, operators, methods, and so on. The following pseudocode examples illustrate a class "Doc" of XML documents and a class "Dtd" of XML DTDs. Elements in DTDs are declared hierarchically. In typical embodiments of the present invention, the hierarchical structures of elements in source DTDs and target DTDs are stored and represented in computer memory and through computer user interfaces as tree structures.

In our pseudocode examples, the parts of a Doc are name, body, and dtd. The parts of a Dtd are root and body. In the following examples, the line numbers are for reference and are not part of the example as such:

Example body of a Dtd with root BOOK:
1. <!ELEMENT BOOK (TITLE,CHAPTER*)>
2. <!ELEMENT TITLE (#PCDATA)>
3. <!ELEMENT CHAPTER (TITLE,TEXT)>
4. <!ELEMENT TEXT (#PCDATA)>

Example body of a Doc named ExampleBOOK with dtd the example Dtd above:
1. <BOOK>
2. <TITLE>Exemplary Book</TITLE>
3. <CHAPTER>
4. <TITLE>Chapter 1</TITLE>
5. <TEXT>This is the text of Chapter 1.</TEXT>
6. </CHAPTER>
7. <CHAPTER>
8. <TITLE>Chapter 2</TITLE>
9. <TEXT>This is the text of Chapter 2.</TEXT>
10. </CHAPTER>
11. </BOOK>

Both Doc and Dtd contain elements, so we deal with classes DocElement and DtdElement. The parts of a DtdElement are name, skeleton, dtdpath, and repeating. The part called repeating is Boolean valued. The dtdPath is a member of the Class of DtdPaths, which are sequences of names representing paths from the root of a tree (when the Dtd is viewed as a tree or in general as a forest of trees).

The occurrence of the character string "TITLE" in line 3 of the example Dtd is an example (example A) of a DtdElement. In example A, the name is TITLE, the skeleton is <TITLE></TITLE>, the dtdPath is the sequence <BOOK, CHAPTER,TITLE>and the value of repeating is False. Note that there is another element in the example Dtd with the name TITLE. This other element (example B) has dtdPath <BOOK,TITLE>. The occurrence of the string "CHAPTER*" in line 1 of the example Dtd is an example (example C) of a DtdElement for which the value of repeating is True.

The parts of a DocElement are name, skeleton, docPath, and value. The docPath is a member of the Class of DocPaths, which are sequences of <name,integer>pairs. The entire character string of line 8 of the example Doc is an example (example a) of a DocElement. In example a, the name is TITLE, the skeleton is <TITLE></TITLE>, the docPath is the sequence <<BOOK,1>,<CHAPTER,2>, <TITLE,1>>, and the value is "This is the text of Chapter 2." The entire character string of line 2 of the example Doc is another example (example b) of a DocElement. The contents of lines 3 through 6 of the example Doc is yet another example (example c) of a DocElement. In our example Doc the data is all at the leaves of the tree and the value of example c is not defined.

We use the operator project to produce a DtdPath from a DocPath in the obvious way.

Example a projects to example A, example b projects to example B, and example c projects to example C. We also use the operator project to produce a DtdElement from a DocElement in the obvious way. The operator findNext, operating on a Doc with a pair of parameters consisting of a DtdElement and a possibly null DocElement will produce a possibly null DocElement that is the next Element of the doc after the given DocElement that would project to the given DtdElement, if any (null, otherwise). The operator findNext only uses the dtdPath and docPath parts of its parameters, so we also use it with DtdPath and DocPath parameters instead of DtdElement and DocElement parameters.

The operator insertNext, operating on a Doc doc, with a DtdElement dtdElement as parameter, returns a DocElement that projects to dtdElement after inserting dtdElement.skeleton if necessary. If dtdElement.repeating is True then the DocElement returned must be a result of inserting dtdElement.skeleton., that is, it must have a null value. A pair of docElements is said to be consistent if the shared initial subsequence of their docPaths projects to a sequence that contains the shared initial subsequence of the dtdpaths of their projections as dtdElements. Examples a and b are consistent; but examples a and c are not.

The process of disambiguating references to elements is a process of turning names into DtdElements and then, at conversion time, turning DtdElements into DocElements. The user who types a name that syntactically must refer to one (or more) DocElements but might refer to different DtdElements is prompted to select a DtdPath by pointing to a tree representation of the body of the Dtd. Then the user is prompted to provide a selection criterion that will allow the determination of one (or more) specific DocElements that would project to the specified DtdElement. The process is engaged recursively when the user types names while providing the selection criterion.

An Eprogram has two parts: a Dtd called dtd and a set of instructions in some programming language called program, where each occurrence of a free variable in program is a Reference and each Reference has two parts: a DtdElement of dtd called dtdElement and a possibly empty Bprogram called bProgram, where a bProgram is an Eprogram and bProgram.program returns a Boolean value. A Vprogram is an Eprogram such that its program returns a character string value. Eprograms are thus hierarchical collections of programs. In an example embodiment of the invention, all Dtds in this hierarchy are required to be identical.

A TargetDtdContext is a collection of parts including a Dtd called targetDtd, a Dtd called sourceDtd, a DtdPath called targetDtdPath from targetDtd.root to a leaf of targetDtd, and a possibly empty sequence of <DtdElement, DtdElement>pairs called 'association' such that the first member of a pair is a repeating DtdElement from targetDtd and the second member of a pair is either a repeating DtdElement from sourceDtd or null, and such that the first elements of the sequence form the subsequence of repeating dtdElements of targetDtdPath.

A Rule is a collection of parts including a TargetDtdContext called targetDtdContext and a Vprogram called value such that targetDtdContext.sourceDtd and value.dtd are identical.

Evaluating a Vprogram at Conversion Time

At conversion time, references in an Eprogram are evaluated hierarchically. In one example embodiment of the invention, if there is no Bprogram for a Vprogram Reference, a default Bprogram is supplied that always returns True. At conversion time, the value of the first DocElement that projects to the dtdElement of a Reference for which the Bprogram returns True is the value used in any Eprogram as the value of the Reference, In other words, Vprogram References are loaded with the first value for which their Bprograms return True, and then executed to produce a return value. For a lower level Reference (in the Eprogram hierarchy), the value loaded is that of the first DocElement that projects to the dtdElement and is consistent with all of the docElements being used for values for References above this reference in the hierarchy and for which the Bprogram returns True.

Target Ambiguous or Unambiguous, Source Ambiguous or Unambiguous

FIG. 1a is a block diagram of the overall structure of typical exemplary embodiments of the present invention. As shown in FIG. 1a, in typical embodiments, a mapping application (102) produces a map (164) in dependence upon a source DTD (150) and a target DTD (152). Mapping applications of the present invention typically build tree structures from declarations in the DTDs, display versions of the trees to a user (156), and prompt the user for various mapping choices and disambiguating information through a user interface (154). The source DTD (150) governs the structure of source XML documents (158), and the target DTD (152) governs the structure of target XML documents (160). At conversion time, a conversion application (162) creates a target XML document (160) from a source XML document (158) by use of the map (164). As the term is used in this disclosure, and particularly in the perspective of our pseudocode examples, a map is a collection of Rules, and the specific goal of the present invention is to assist the user in specifying Rules. This is the overall project of typical embodiments of the present invention. Now we turn to more detail.

Figure 1B:
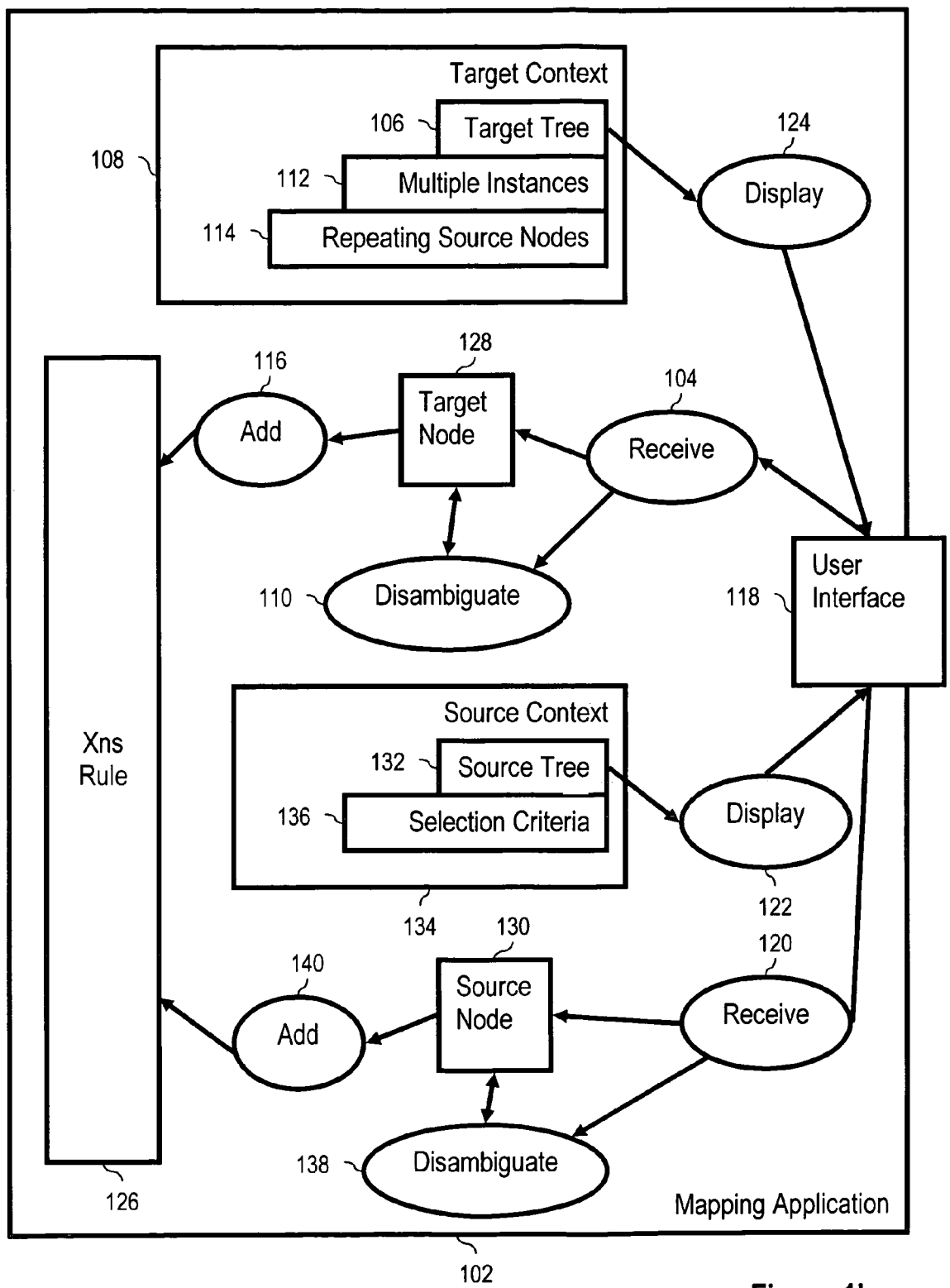
FIG. 1b is a data flow diagram illustrating structure and operation of one or more exemplary embodiments of the present invention.

Turning now to FIG. 1b, an example embodiment of the invention is seen as a method for graphical specification of an XML to XML transformation rule (126). More particularly, an example embodiment of the invention is seen as a method for graphical specification of a Rule.

Exemplary embodiments of the kind shown in FIG. 1b typically implement methods for graphical specification of XML to XML transformation rules where source and target DTDs (150 and 152 on FIG. 1a) are viewed as trees with certain nodes distinguished as repeating nodes (as the trees illustrated in FIGS. 8–12). In such embodiments, a source context consists of a source tree, a determined source subtree (that is, the subtree determined as the part of the tree that is unambiguous), and a (possibly empty) set of associations between source nodes and selection criteria (the associations comprising disambiguating data elements, including, for example, both selection criteria and programmatic applications of selection criteria). A selection criterion is a program for selecting which of potentially multiple instances of the associated XML element in an XML document is meant by a given reference. A source node is ambiguous with respect to a source context if it is not in the determined subtree and if it is either a repeating node not associated with a selection criterion or a descendent of such a node.

In such embodiments, a target context consists of a target tree and a single path (possibly empty) from the root of the tree to some repeating node together with an association for each repeating node on the path, the association either connecting the repeating node to an indication that a single instance is desired or to an indication that multiple instances are desired plus reference to a repeating source node in a source context in which the ancestor of the source node, if any, is unambiguous. A target node is unambiguous with respect to a target context if the context path includes every repeating node on the path between the root and the node (including both root and other nodes).

In exemplary embodiments of the invention an XML document satisfying a DTD is viewed as a tree wherein nodes corresponding to repeating nodes in the DTD may occur multiply, a specific node of an XML document tree corresponding to a second specific node of a DTD tree if the ordered list of names of nodes on the path from the root to the specific node (including the specific node) is identical to the ordered list of names of nodes on the path from the root to the second specific node. With respect to a satisfied DTD, the selection of a specific node in a satisfying XML document is said to determine (the selection of) all nodes in the XML document from which there is possibly empty first path, involving no nodes that correspond to repeating nodes in the DTD, to a node that lies on the path from the root to the specific node. With respect to a satisfied source DTD and a source context, the selection of a specific node in a satisfying XML document is said to recursively determine (the selection of) all nodes in the XML document from which there is a possibly empty first path, involving nodes that are unambiguous with respect to the source context, to a node that lies on the path from the root to the specific node.

In exemplary embodiments of the invention a user-specified selection criterion associated with a user-selected source node in a source context is a program referencing source tree nodes that are unambiguous with respect to the context and returning a Boolean value. In a source document satisfying the source DTD, the user-specified selection criterion designates at most one instance of the XML element corresponding to the associated user-selected source tree node, the designated instance being the first such instance encountered in a left-to-right pass through the source document for which the program returns the value True, when each of its references to a source tree node is replaced by the value, if any, for the corresponding node in the source XML document that is recursively determined by the said designated instance.

Graphical specification means that the user is presented through a user interface with a graphical representation in the form of a tree structure of the governed relations among elements in XML documents and prompted to select a target element to which source elements are to be mapped and source elements to map to the selected target element. To the extent that selected elements are ambiguous, the user is prompted to enter selection criteria, logical relations among variables, sufficient to disambiguate selected elements. To the extent that the selection criteria refer to additional ambiguous elements, the same disambiguation process is applied recursively until all such elements are disambiguated. To the extent that more than one source element is selected for mapping to a target element, the user is prompted to enter operators for combining the source elements, counting, adding, concatenating, and so on.

More particularly, in the perspective of our pseudocode examples above, the user is prompted to select a target DtdElement from a graphical representation of a target Dtd. Having chosen a target DtdElement for which execution of the Rule is to provide a value, the user is prompted to enter the program part of a Vprogram and to create References to source DtdElements by selecting them from a graphical representation of a source Dtd.

To the extent that multiple combinatorial source elements are ambiguous, they too are recursively disambiguated. This process is repeated until all elements to be mapped are mapped.

Mapping applications (102) of the present invention are computer programs that assemble, into source code files or other mapping technologies, transformation rules comprising user selected target and source elements, selection criteria, and operations on multiple combinatorial source elements. A transformation rule is implemented in any program in any programming language or other mapping technologies for the purpose of composing one, possibly repeating, target leaf node from source leaf nodes. Computer programming languages useful to implement transformation rules of the present invention include C, C++, Java, Visual Basic, Cobol, Fortran, and other languages as will occur to those of skill in the art. The programming language in some embodiments, at least, comprises a very restricted set of operators on character strings or a complete general purpose language.

Users' selections of target elements and source elements along with disambiguating selection criteria and operators combining multiple source elements comprise translation rules. For example, in a translation application created from a mapping application of the present invention the source XML document is parsed and a dummy target XML document with all null values is prepared. Then one-by-one the translation rules are executed. In the perspective of our example pseudocode, an example translation rule to place the value for the first DocElement that projects to a DtdElement VendorName from the source document in the value for a next leaf DocElement in the target document that projects to a repeating DtdElement CustomerName operates like this:

```
DocElement  element=sourceXMLDocument.findNext
   (VendorName,null);
DocElement  target=targetXMLDocument.insertNext
   (CustomerName);
target.value=element.value;
```

In a trivial case, a user maps a constant to a target leaf node, thus effectively mapping 'zero' source leaf nodes. Embodiments are more useful, however, in mapping at least one source node to a target node, particularly when either the target node or the source node, or both, are ambiguous either because a mapped node is itself repeating or because a mapped node has one or more repeating ancestors.

A node is spoken of in this disclosure as being 'repeating' if it represents an element declared in a DTD as repeating, in our pseudocode terminology, a 'DtdElement.' The nodes themselves of course are merely branches and leaves in tree-type data structures and therefore do not literally themselves 'repeat.' 'Repeating nodes' are nodes that represent repeating elements, and repeating elements do 'repeat' in the sense that they are authorized through their DTD declarations to occur more than once in conforming XML documents.

The declaration form

<!ELEMENT element-name (child-name)> declares only one occurrence of a child element, such that the example declaration <!ELEMENT note (message)> declares the child element 'message' can occur only once inside the 'note' element. Because elements declared in DTDs by such declarations can occur only once in a context, such elements are not considered repeating elements, and nodes representing such elements are not considered repeating nodes.

The declaration form

<!ELEMENT element-name (child-name+)>, however, is used to declare that a child element must occur at least once and may occur more than once, such that the example declaration <!ELEMENT note (message+)> declares that the child element 'message' must occur one or more times in the 'note' element. Similarly, the form of declaration <!ELEMENT element-name (child-name*)> declares that a child element can occur zero or more times in an ancestor element, such that the example declaration <!ELEMENT note (message*)> declares that the 'message' child element can occur in the 'note' element zero or more times. Nodes representing elements declared with '+' or '*,' that is, repeating elements, are considered 'repeating nodes,' because the repeating elements so represented can occur more than once in XML documents that comply with DTDs in which the repeating elements are declared.

Embodiments according to FIG. 1b typically include receiving (104) a user's selection of a user-selected, optionally ambiguous, target leaf node (128), from a target tree (106) of an initial target context (108), the target leaf node (128) representing a target XML element to be mapped by the transformation rule (126).

As mentioned earlier, relations among XML elements in DTDs are declared, and therefore structured, hierarchically. This inherent hierarchy lends itself well to representation in tree-style data structures in computer memory and in computer displays, and such structures are used in typical embodiments of the present invention. Although we refer to such structures for convenience in this disclosure as 'trees,' in fact there is no requirement in the present invention for any particular kind of tree structure. Any kind of hierarchical representation will do, indexed, linked lists, standard library container objects, and so on, as will occur to those of skill in the art.

Trees, both target trees and source trees, as stored in computer memory and as displayed through user interfaces are components of a context. Contexts are data structures that include an instance of a tree, indication of ambiguity for each leaf node in the tree, and a collection of disambiguating data elements whose application results in the present state of ambiguity of the tree in the context. An initial target context (108), contains only a tree representing the elements and relations among elements defined in a DTD and indications of ambiguity for each leaf node in the tree. An initial target context contains no disambiguating data elements because none of the ambiguous leaves, if there are any, has yet been disambiguated. Disambiguating data elements include, as will be discussed in more detail below, indications whether repeating target nodes require multiple instances, references to repeating source nodes for repeating target nodes requiring multiple instances, and selection criteria for ambiguous source nodes.

Note that generally, and particularly in the perspective of our pseudocode examples, context is implicit in a Rule. For example, in the prospective of our pseudocode examples, the hierarchical context of selection criteria for ambiguous source nodes is represented by the Vprogram of the Rule in the hierarchy of References and Bprograms.

Embodiments of the kind shown in FIG. 1b typically include receiving (104) a user's selection of a target leaf node (128). Receiving a selection of a target leaf node in such embodiments typically includes scanning through a target DTD and registering in a tree-style data structure the elements declared in the target DTD. The 'target DTD' is a target DTD in the sense that it describes elements, attributes of elements, and relations among elements that a target XML document must comply with. In typical embodiments of the present invention, the elements available for mapping into a target XML document are known because they are the elements declared in a target DTD, scanned into a tree structure and displayed through a user interface, such as a windowing GUI, for selection by a user. Selection is carried out by normal operations of a user interface, including, for example, mouseclick selections, tab key and enter key selections, and so on.

The selected target leaf node is ambiguous if it is itself a repeating node or if it has one or more ancestor nodes that are repeating nodes. If the target leaf node (128) is ambiguous, typical embodiments include disambiguating (110) the target leaf node (128). Disambiguating target leaf nodes is described in detail below.

Typical embodiments of the kind shown in FIG. 1b include adding (116) the (now unambiguous) target leaf node (128) to the transformation rule (126). Typical embodiments also include receiving (120) a user's selection of at least one user-selected, optionally ambiguous, source leaf node (130), from a source tree (132) of an initial source context (134), wherein the source leaf node (130) represents a source XML element to be mapped to the target leaf node by the transformation rule (126).

The user selects "at least one" source leaf node. For brevity and clarity, this disclosure generally speaks of mapping a singular source node to a target node, but there is nothing in the invention itself that limits mappings to a target node to a single source node. Embodiments of the present invention typically support selection of several source nodes to map to one target node and also support specification of operations to be performed on the source nodes to develop a value for insertion into a target node. In fact, it is common for more than one source node to be selected for mapping to a target node, including, for example, adding the values of several source nodes to place a sum in a target node, counting occurrences of source nodes and mapping a total into a target node, concatenating several source nodes into a single target node, and so on. Moreover, recursive disambiguation of the present invention works the same regardless of the number of ambiguous source nodes to be mapped to a target node. Persons of skill in the art will think of many uses for mapping more than one source node to a target node, and all such uses are well within the scope of the present invention.

More particularly, in the perspective of our pseudocode examples, the selection of a source node to map to the selected target node creates a Reference in the Vprogram part of the Rule being specified. The selected source leaf node is ambiguous if it is a repeating DtdElement or has a repeating ancestor in the source Dtd. If the source leaf node is ambiguous, typical embodiments include disambiguating (138) the source leaf node (130). Typical embodiments also typically include adding (140) the (now unambiguous) user-selected source leaf node (130) to the transformation rule (126).

Target Unambiguous, Source Ambiguous

Figure 2:
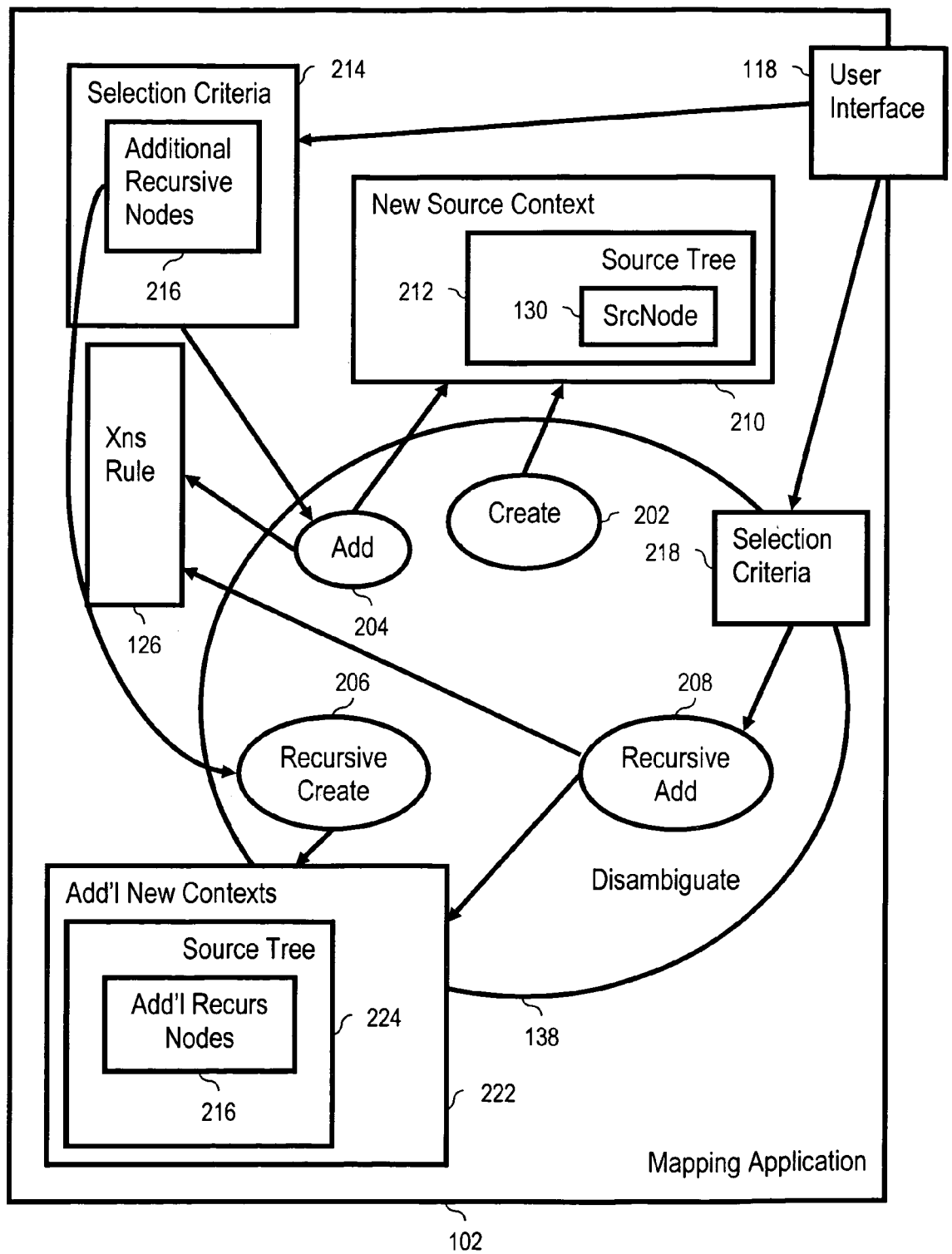
FIG. 2 is a data flow diagram illustrating structure and operation of one or more exemplary embodiments of the present invention.

Turning now to FIG. 2, a further embodiment of the invention is shown in which a selected source leaf node (130) is ambiguous. In such embodiments, disambiguating (138) the source leaf node typically includes creating (202) a new source context (210) for the selected source leaf node (130).

Embodiments of the kind shown in FIG. 2 typically include adding (204) to the new source context and to the transformation rule (126) a user-specified selection criterion (214) for the first source node (130), wherein the selection criterion (214) for the first source node optionally recursively includes one or more additional ambiguous source nodes (216). More particularly, the selection criterion (214) optionally recursively includes one or more additional ambiguous source nodes (216) in the sense that the selection criterion often comprises references to addition source nodes, which may or may not themselves be ambiguous, as well as logical operations upon the additional source nodes.

Embodiments of the kind shown in FIG. 2 typically include recursively creating (206) additional new contexts (222) for the additional ambiguous source nodes (216). Such embodiments typically include recursively adding (208) to the additional new contexts (222) and to the transformation rule (126) user-specified selection criteria (218) for the additional ambiguous source nodes (216).

Still more particularly, in the perspective of our pseudocode examples, when a user adds a new Reference r to the vProgram of a Rule and the Reference r is ambiguous, the user is prompted to add a Bprogram to r. If the new Bprogram includes an ambiguous reference s, the user is recursively prompted to add a Bprogram to s. A Reference r in a (hierarchical) Eprogram is ambiguous if the DtdPath from its dtdElement to the root contains a repeating DtdElement e such that e is not contained in any path from s.dtdElement to root for any Reference s that is either r or an ancestor to r in the Eprogram hierarchy. The Eprogram hierarchy encodes the context.

Figure 3:
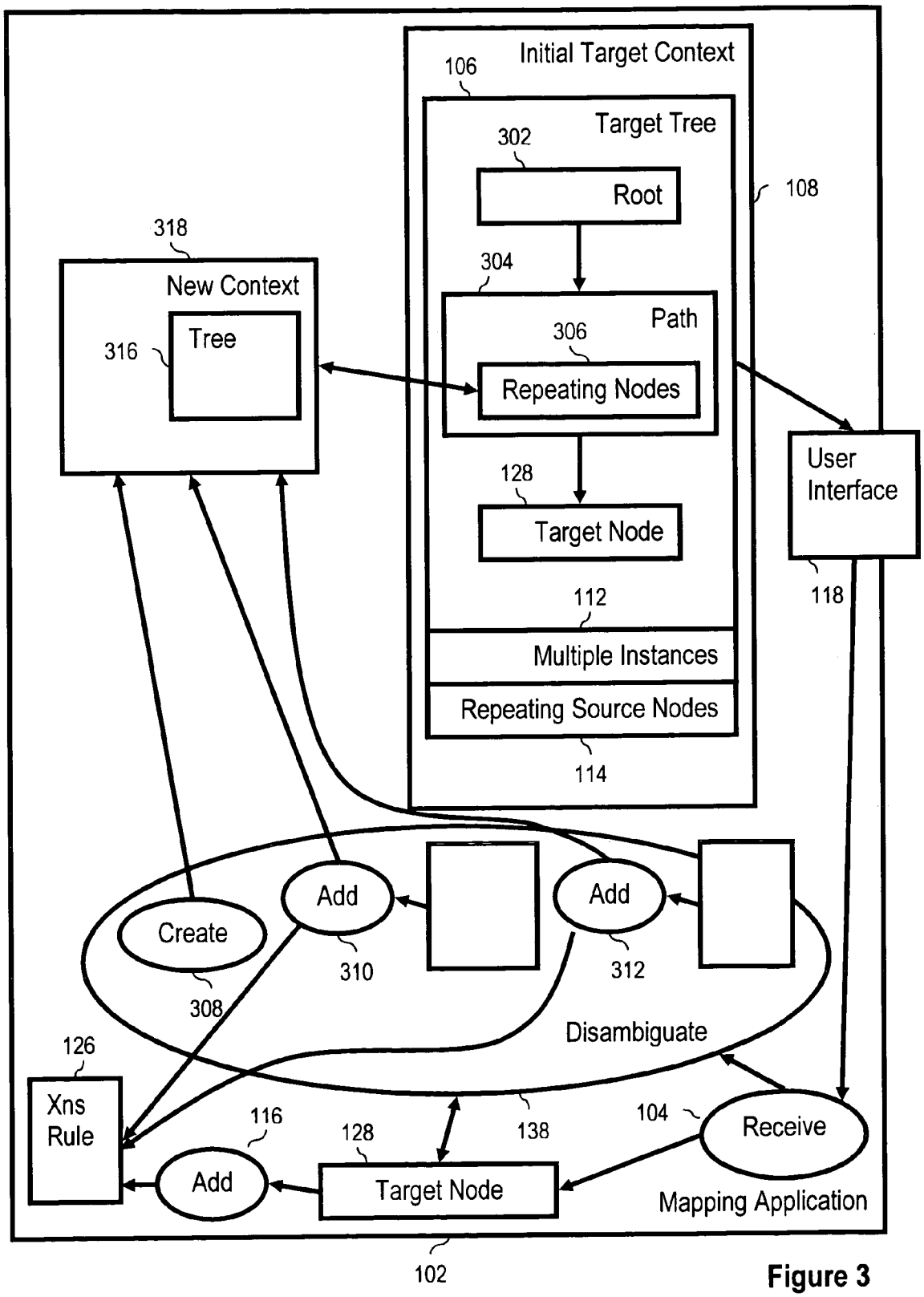
FIG. 3 is a data flow diagram illustrating structure and operation of one or more exemplary embodiments of the present invention.

Target Ambiguous, Source Unambiguous Target Ambiguous Because Target Leaf has Repeating Ancestors Create a New Context Turning now to FIG. 3, a further embodiment of the present invention is shown in which a target leaf node (128) is ambiguous, and the example embodiment includes receiving (104) a user's selection of the target leaf node. In the illustrated example, receiving a user selection of the target leaf node includes receiving a user's selection of the target leaf node (128), from a target tree (106) of an initial target context (108), the target leaf node (128) representing a target XML element to be mapped by the transformation rule (126). The target tree has a root (302) and a path (304) from the root (302) to the target leaf node (128). In this exemplary embodiment, the path excludes the target leaf node itself, and the path includes one or more repeating nodes (306). It is the present of these repeating nodes in the path above the target leaf, that is, one or more repeating ancestor nodes, that makes the target leaf note ambiguous.

Embodiments of the kind shown in FIG. 3 typically include disambiguating (138) the target leaf node. Disambiguating the target leaf node typically includes creating (308) a new context (318) for each repeating node (306) in the tree path (304) between the root (302) and the target leaf node (128).

Embodiments of the kind shown in FIG. 3 typically also include adding (310), to each new context (318) and to the transformation rule (126), for each repeating node (306) in the tree path (304) between the root (302) and the target leaf node (128), a user-specified indication (316) whether each such repeating node represents an XML element mapped with multiple instances. In embodiments of this kind, it is an indication that a repeating node is mapped with a single instance of the element it represents that disambiguates target leaf nodes not requiring multiple instances.

Embodiments of the kind shown in FIG. 3 typically also include adding (312), to each new context (318) and to the transformation rule (126), a user-selected repeating source node (314) for each repeating target node (306) in the tree path (304) between the root (302) and the target leaf node (128) that represents an XML element mapped with multiple instances. In embodiments of this kind, it is an identification the addition of a repeating source node for a repeating target ancestor node mapped with multiple instances that disambiguates repeating target ancestor nodes requiring multiple instances.

More particularly, in the perspective of our pseudocode examples, when a user selects a target DtdElement t as the target of a Rule and the selection is ambiguous because there is at least one repeating DtdElement on the path from root to t, the user is prompted to create a TargetDtdContext with targetDtdPath, the path from root to x, where x is the first repeating ancestor of t or t if t is repeating, or to select an already existing TargetDtdContext with targetDtdPath from root to the first repeating ancestor of t. A new TargetDtdContext may be created by selecting a previous TargetDtdContext and extending its path.

Figure 4:
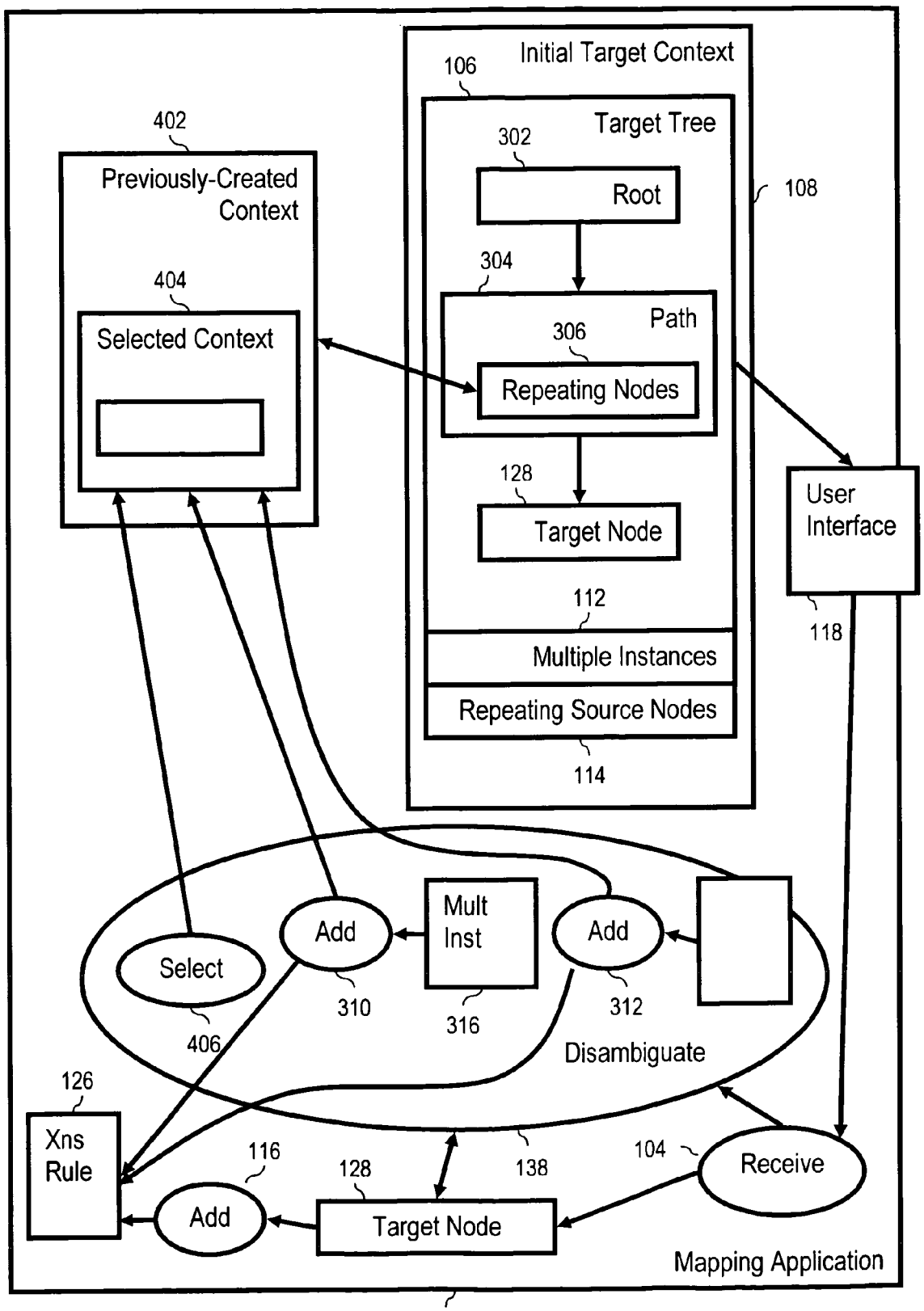
FIG. 4 is a data flow diagram illustrating structure and operation of one or more exemplary embodiments of the present invention.

Target Ambiguous, Source Unambiguous Target Ambiguous Because Target Leaf has Repeating Ancestors Select Existing Target Context Rather than Creating a New One Turning now to FIG. 4, a further embodiment of the invention is shown in which a target leaf node (128) is ambiguous, and receiving (104) a user's selection of the target leaf node further comprises receiving a user's selection of the target leaf node (128), from a target tree (106) of an initial target context (108). In this example, the target leaf node (128) represents a target XML element to be mapped by the transformation rule (126). The target tree has a root (302), and the target leaf node has a path (304) from the root (302) to the target leaf node (128). Again in this example the path excludes excluding the target leaf node itself, and the path includes one or more repeating nodes (306) that render the target leaf node ambiguous.

Embodiments according to FIG. 4 typically include disambiguating (138) the target leaf node. Disambiguating the target leaf node in such embodiments typically includes selecting (406), from among previously-created contexts (402), a selected context (404) for at least one repeating node (306) in the tree path (304) between the root (302) and the target leaf node (128).

Embodiments of the kind shown in FIG. 4 typically include adding (310), to each selected context (404) and to the transformation rule (126), for the at least one repeating node (306) in the tree path (304) between the root (302) and the target leaf node (128), a user-specified indication (316) whether each such repeating node represents an XML element mapped with multiple instances. For repeating target leaf nodes not requiring mappings of multiple instances, it is an indication that such a repeating node is not to be mapped with multiple instances that disambiguates the node.

In embodiments of the kind shown in FIG. 4, if the at least one repeating node (306) represents an XML element mapped with multiple instances, then such embodiments typically include adding (312), to each selected context (404) and to the transformation rule (126), a user-selected repeating source node (314) for the at least one repeating node (306). For such repeating ancestor nodes, it is the addition of a corresponding repeating source node that disambiguates a repeating ancestor target node.

Figure 5:
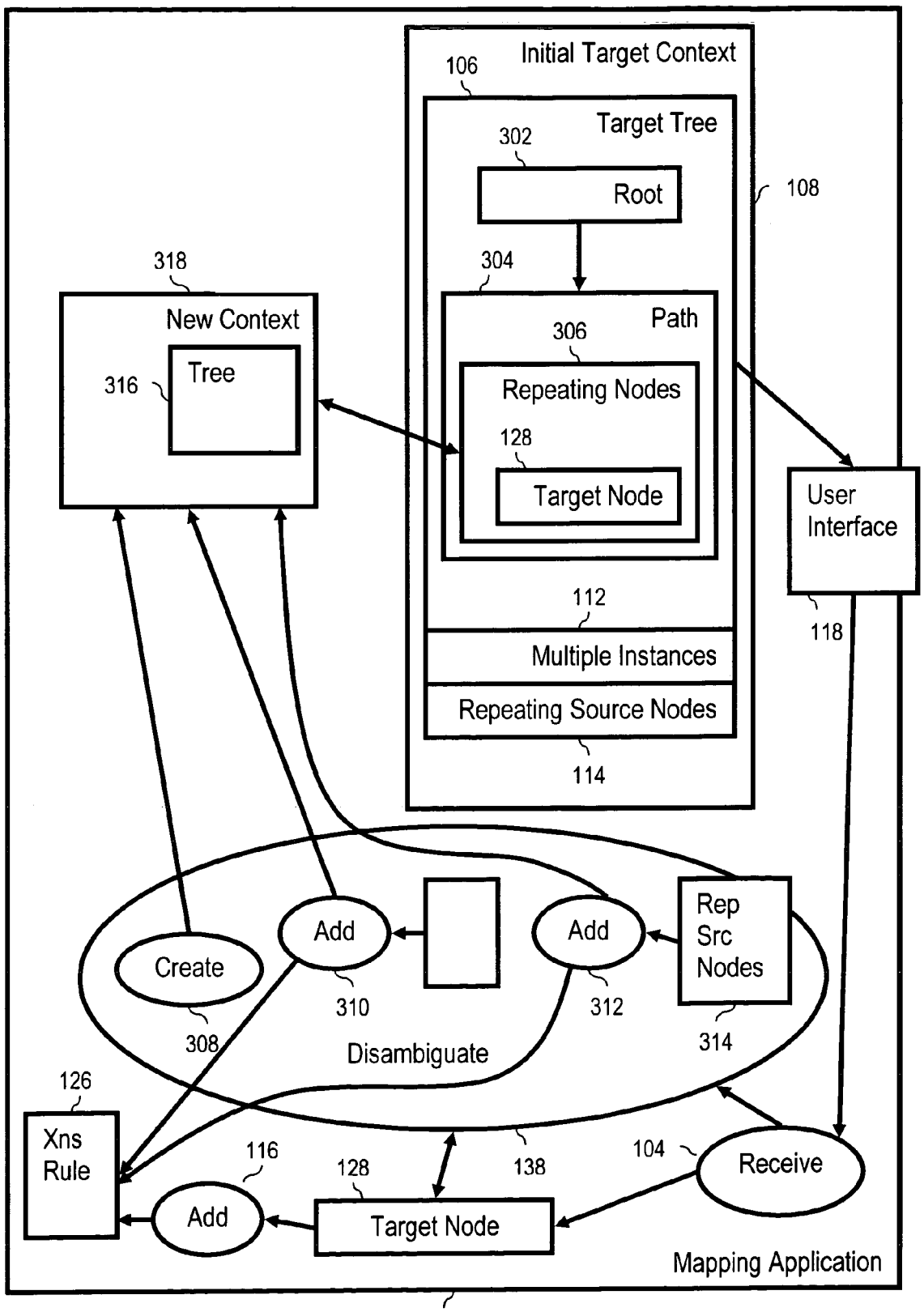
FIG. 5 is a data flow diagram illustrating structure and operation of one or more exemplary embodiments of the present invention.

Target Ambiguous, Source Unambiguous Target
Ambiguous Because Target Leaf Itself is
Ambiguous, with or Without Repeating Ancestors
Create New Target Context Turning now to FIG. 5, a further embodiment of the present invention is seen as a method for graphical specification of an XML to XML transformation rule (126).

Embodiments according to FIG. 5 typically include receiving (104) a user's selection of a user-selected, ambiguous, target leaf node (128), from a target tree (106) of an initial target context (108), the target leaf node (128) representing a target XML element to be mapped by the transformation rule (126). The target tree has a root (302), and the target leaf node (128) has a path (304) from the root (302) to the target leaf node (128). In this kind of embodiment, the path (304) includes the target leaf node itself (128). The path, including the target leaf node, includes one or more repeating nodes (306), thus making the target leaf node ambiguous. In this kind of embodiment, therefore, the target leaf node is sometimes ambiguous because only the target leaf node itself is repeating, sometimes ambiguous because the target leaf node is repeating and has repeating ancestors, sometimes ambiguous merely because of one or more repeating ancestor.

Embodiments of the kind shown in FIG. 5 typically include disambiguating (138) the target leaf node (128) and adding (116) the (now unambiguous) target leaf node (128) to the transformation rule (126). In such embodiments, disambiguating (138) the target leaf node (128) typically includes creating (308) a new context (318) for each repeating node (306) in the tree path (304) between the root (302) and the target leaf node (128).

Embodiments of the kind shown in FIG. 5 typically include adding (310), to each new context (318) and to the transformation rule (126), for each repeating node (306) in the tree path (304) between the root (302) and the target leaf node (128), a user-specified indication (316) whether each such repeating node represents an XML element mapped with multiple instances. In such embodiments, it is an indication that a repeating node is not to be mapped with multiple instances that disambiguates the repeating target node.

Embodiments of the kind shown in FIG. 5 typically include adding (312), to each new context (318) and to the transformation rule (126), a user-selected repeating source node (314) for each repeating node (306) in the tree path (304) between the root (302) and the target leaf node (128) that represents an XML element mapped with multiple instances. For repeating target nodes requiring multiple instances in this kind of embodiment, it is the addition of an associated repeating source node that disambiguates the repeating target node.

Figure 6:
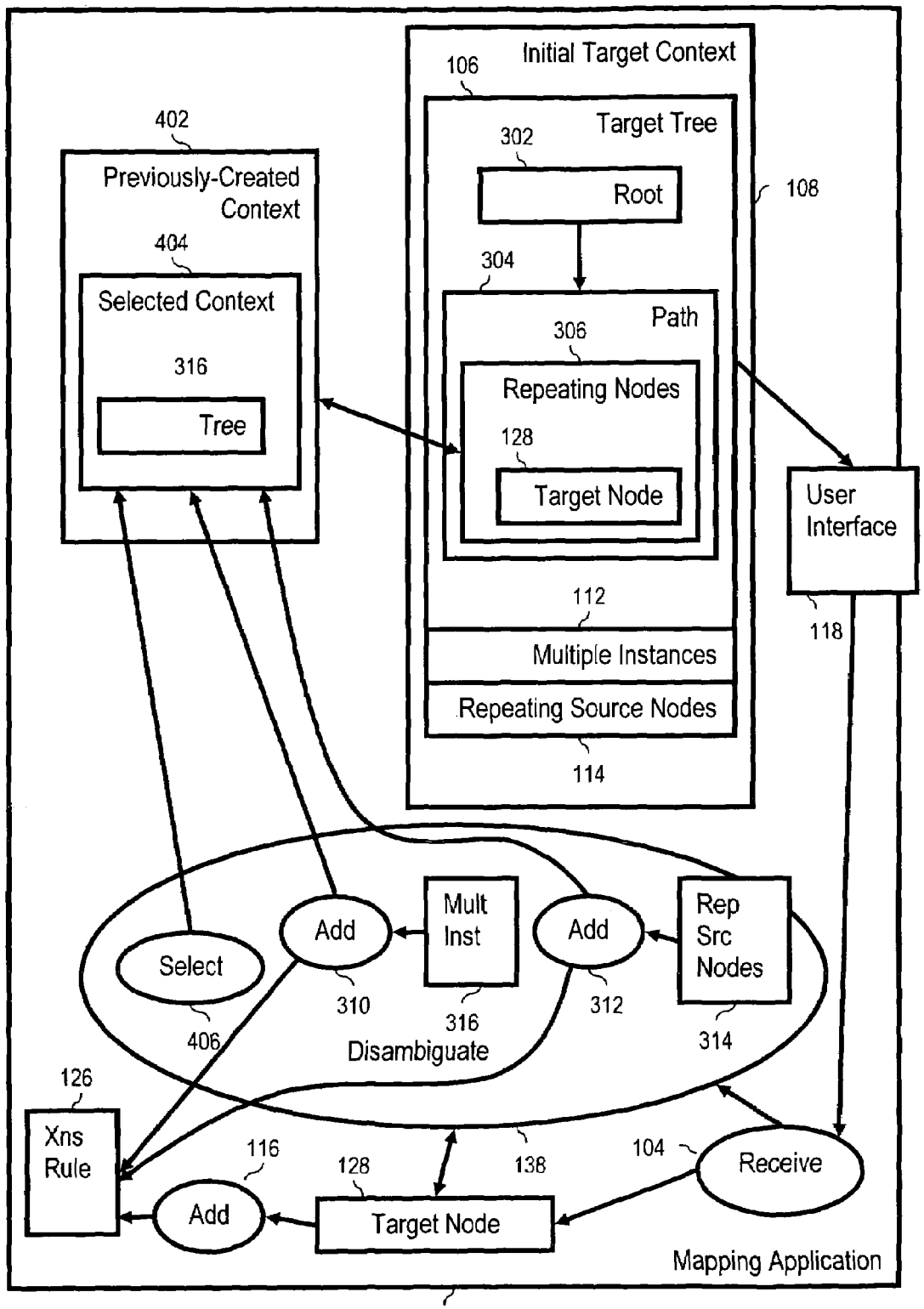
FIG. 6 is a data flow diagram illustrating structure and operation of one or more exemplary embodiments of the present invention.

Target Ambiguous, Source Unambiguous Target
Ambiguous Because Target Leaf Itself is
Ambiguous, with or Without Repeating Ancestors
Select Existing Target Context Rather than Creating
a New One Turning now to FIG. 6, a further example embodiment of the present invention is shown in which disambiguating an ambiguous target leaf node includes selecting (406), from among previously-created contexts (402), a selected context (404) for at least one repeating node (306) in the tree path (304) between the root (302) and the target leaf node (128). Such embodiments typically include adding (310), to the selected context (404) and to the transformation rule (126), for the at least one repeating node (306) in the tree path (304) between the root (302) and the target leaf node (128), a user-specified indication (316) whether each such repeating node represents an XML element mapped with multiple instances. For repeating target nodes not requiring multiple instances, it is an indication that the node does not require multiple instances that disambiguates the node.

Embodiments of the kind shown in FIG. 6, if the at least one repeating node (306) represents an XML element mapped with multiple instances, typically include adding (312), to the selected context (404) and to the transformation rule (126), a user-selected repeating source node (314) for the at least one repeating node (306). For repeating target nodes requiring multiple instances, it is the addition of an associated repeating source node that disambiguates the repeating target node.

Target Ambiguous, Source Ambiguous

Figure 7:
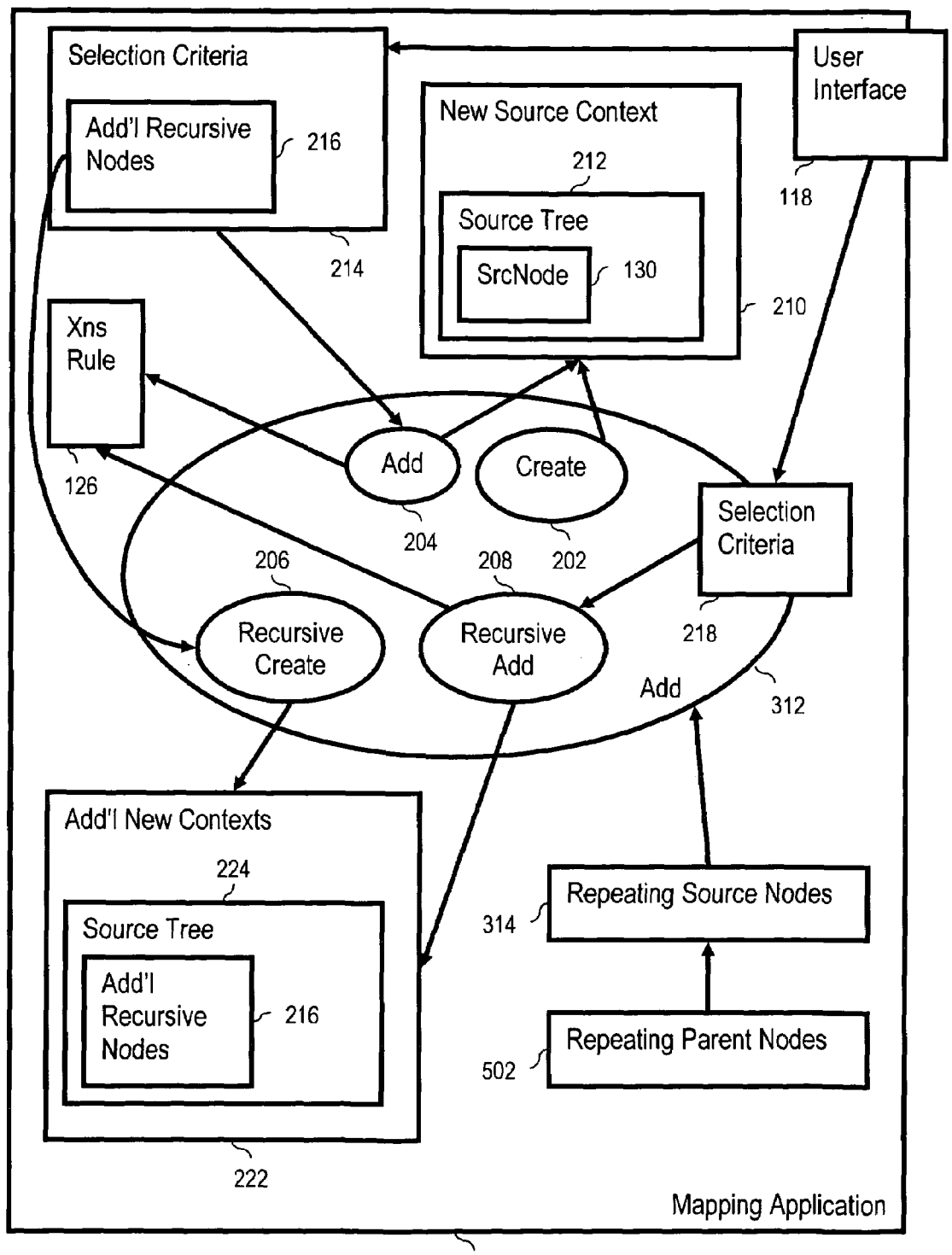
FIG. 7 is a data flow diagram illustrating structure and operation of one or more exemplary embodiments of the present invention.

Turning now to FIG. 7, a further example embodiment of the present invention is shown in which at least one user-selected repeating source node (314) is an ambiguous repeating source node having at least one repeating ancestor node (502). In such embodiments, adding (312) a user-selected repeating source node for each repeating node in the tree path typically includes creating (202) a new source context (210) for the selected source leaf node (130). In such embodiments, adding (312) a user-selected repeating source node for each repeating node in the tree path typically includes adding (204), to the new source context (210) and to the transformation rule (126), a user-specified selection criterion (214) for the first source node, wherein the selection criterion (214) for the first source node optionally recursively includes one or more additional ambiguous source nodes (216). More particularly, the selection criterion (214) optionally recursively includes one or more additional ambiguous source nodes (216) in the sense that the selection criterion often comprises references to addition source nodes, which may or may not themselves be ambiguous, as well as logical operations upon the additional source nodes.

In embodiments of the kind shown in FIG. 7, adding (312) a user-selected repeating source node for each repeating node in the tree path typically includes recursively creating (206) additional new contexts (222) for the additional ambiguous source nodes (216). In such embodiments, adding (312) a user-selected repeating source node for each repeating node in the tree path typically includes recursively adding (208), to the additional new contexts (222) and to the transformation rule (126), user-specified selection criteria (218) for the additional ambiguous source nodes (216).

Exemplary Embodiments in Usage

Figure 8:
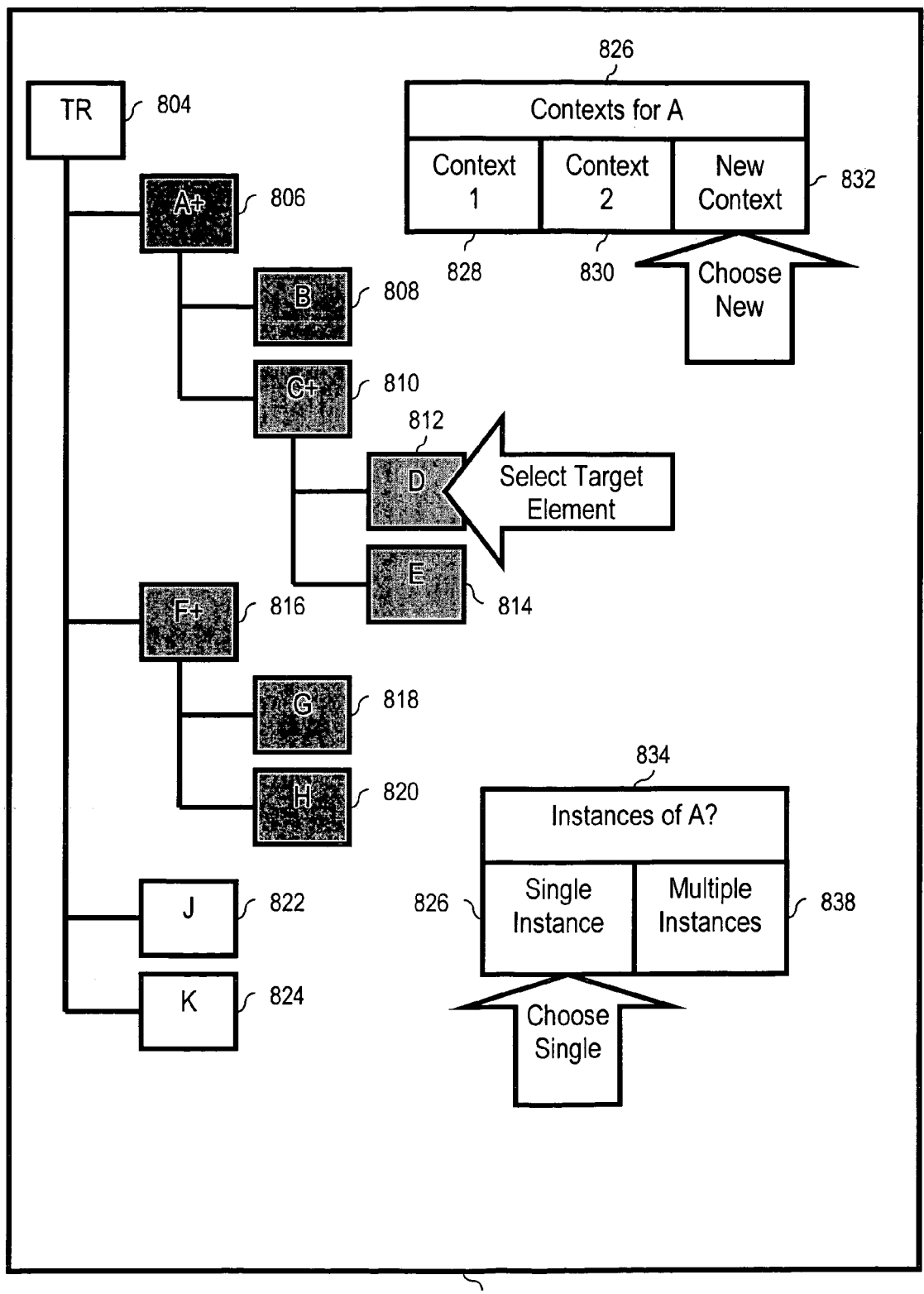
FIG. 8 illustrates a target context of a selected target element D for an exemplary use case.

FIGS. 8–12 illustrate a large running example of an exemplary embodiment of the present invention in operation. FIG. 8 illustrates an initial target context (802) of a selected target element D (812). In the initial context, of course, there is no disambiguating data as yet because no steps have yet been taken to disambiguate element D. Ambiguous nodes in FIGS. 8–12 are indicated by gray backgrounds. In the initial context, nodes A (806), C (810), and F (816) are ambiguous because they represent repeating elements from a target DTD. Their repeating quality is identified by plus signs next to the element names in the node boxes. Nodes B (808), D(812), E(814), G (818), and H (820) are ambiguous because they have repeating ancestor nodes above them in the tree structure.

Element D in the embodiment of FIG. 8 has already been scanned by a mapping application, along with other elements from a target DTD, into a tree structure illustrated in FIG. 8 as including nodes (804–824). The tree structure of FIG. 8 is displayed to a user through a computer user interface in substantially the same format as shown in FIG. 8. The user selects element D for mapping by normal interface operations, such as, for example, in a GUI, a mouseclick on node D (812).

In response to a user's selection of target element D for mapping, the mapping application is programmed to prompt the user to select an existing context for element A (826), if there are any previously-created contexts for element A, or to opt to create a new context for element A. Element D is ambiguous in the initial context because it has two repeating ancestors, elements A (806) and C (810), both indicated as repeating by plus signs. Element A is the first subject of disambiguation because element A is the highest repeating node in the tree above D. In this example, there are two previously-created contexts for A (828, 830), but the user chooses to create a new context (832).

In response to the user's opting to create a new context, the mapping application of the present example is programmed to prompt the user for an indication (834) whether repeating element A is to be mapped with a single instance or multiple instances. As explained above, if the user opts to map A with multiple instances, the mapping application is programmed to prompt for a selection of a repeating source node to supply multiple instances. In this example, however, the user opts to map a single instance (836) of A.

Figure 9:
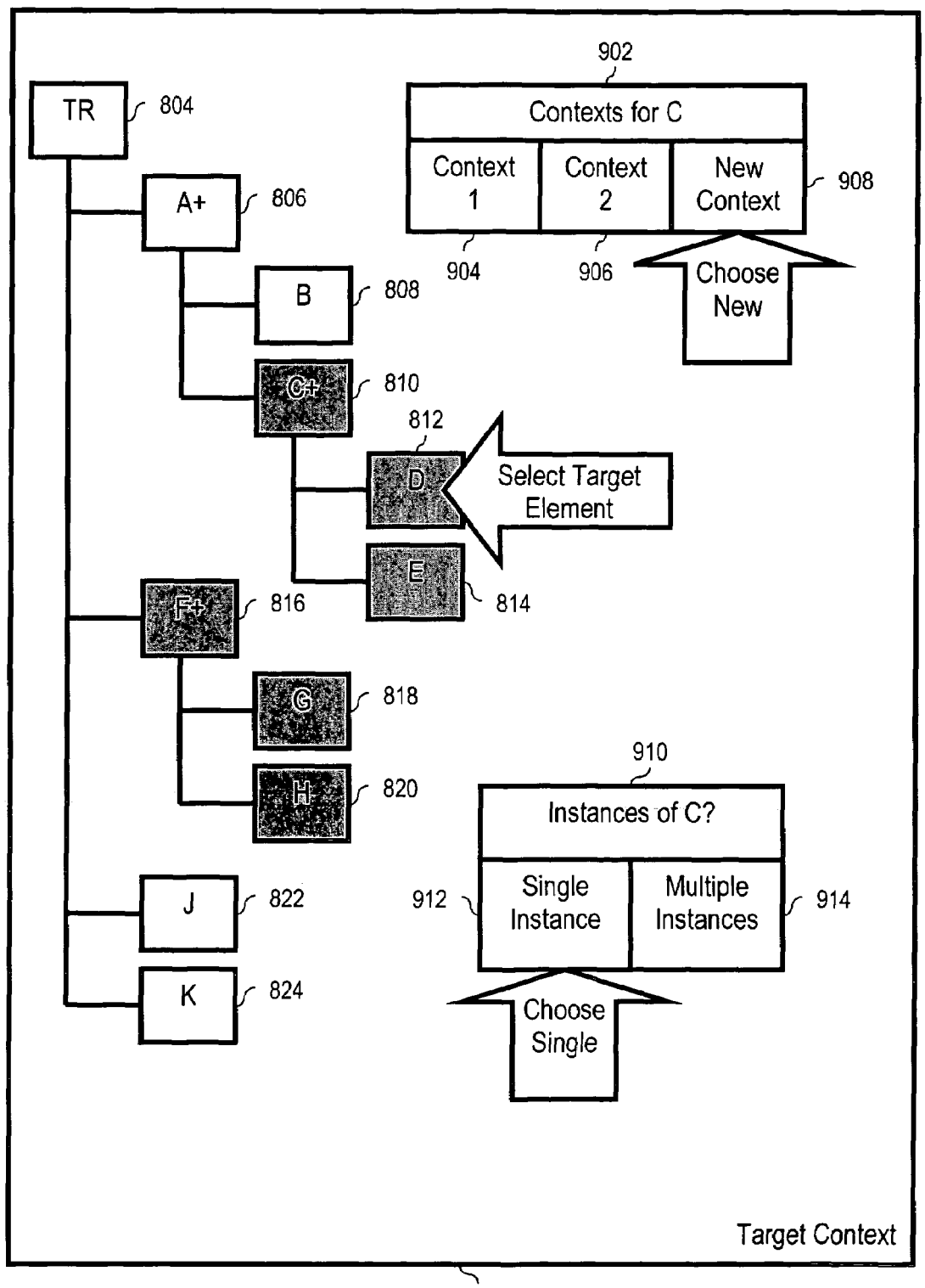
FIG. 9 shows the ambiguity status of the subject tree in a target context after disambiguation of repeating element A in an exemplary use case.

FIG. 9 shows the ambiguity status of the subject tree after disambiguation of repeating element A. In this new context (900), element D is still ambiguous because element D still has an ambiguous ancestor node above it in the tree, that is node C (810). Recursive disambiguation continues. The user again selects element D as a target for mapping, and, because element D still has a repeating ancestor in node C, the mapping application is programmed to prompt the user to select or create a context for C (902). In this example, the user opts to create a new context for C (908). In response, the mapping application is then programmed to prompt for an indication whether C is mapped with a single instance or multiple instances, and again in this example, the user maps element C with a single instance.

Figure 10:
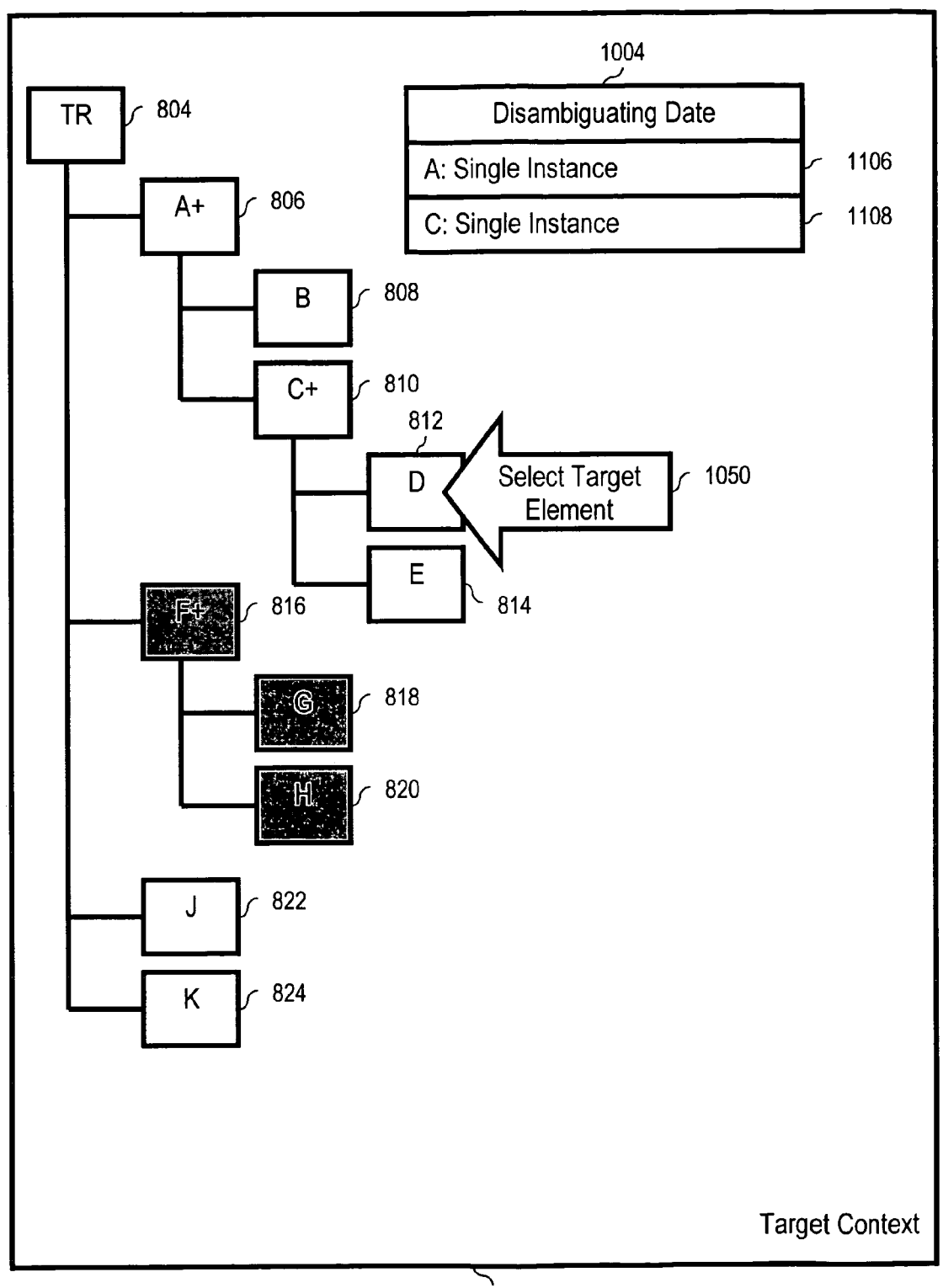
FIG. 10 illustrates a disambiguated status of a target context in an exemplary use case.

FIG. 10 shows a context for D in which D is fully unambiguous. The context in which node D is unambiguous (1002) includes the tree structure (804–824) with indications of ambiguity (gray backgrounds as appropriate) plus the disambiguating data elements, indications that repeating ancestors A and C are to be mapped with single instances (1106, 1108). The indications of ambiguity as gray backgrounds, of course, are for display rather than actual data storage. In an actual data structure in computer memory, ambiguity is represented by a Boolean value, a code in a memory variable, or in other ways as will occur to those of skill in the art, rather than the color gray. Now that D (812) is unambiguous, this time when the user again recursively selects D for mapping (1050), the mapping application is programmed to prompt the user for selection of a source element to map to D.

Figure 11:
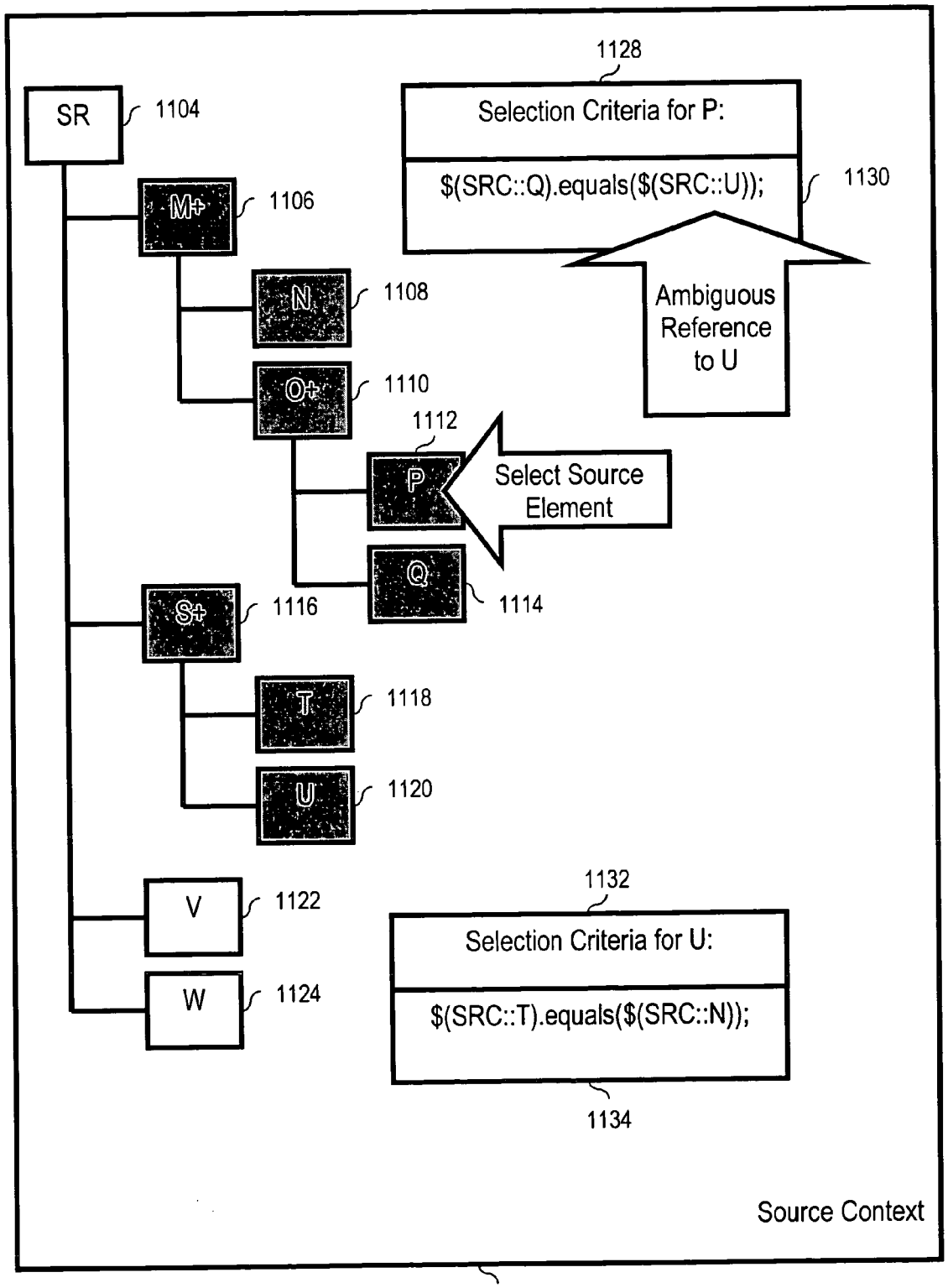
FIG. 11 illustrates a source context in an exemplary use case.

FIG. 11 shows a source tree substantially as it is presented to a user for selection of a source element to map to the target element D. In the example of FIG. 11, the user selects the element represented by node P (1112) to map to target element D. P is ambiguous, having repeating ancestors M (1106) and 0 (1110). In this example, therefore, the mapping application is programmed to prompt (1128) the user to enter selection criteria for element P. The user enters the expression at reference (1130):

$(SRC::Q).equals($(SRC::U));

This particular example is a Java expression for logical equality among the values of elements Q (1114) and U (1120). Java is used merely as an example. Selection criteria can be entered not only in Java, but in computer language or in any format supporting computation.

The character string "$(SRC::Q)" is an example of a way to present a Reference to the user. The "SRC" indicates source, the "$(". . .")" pair of strings distinguishes this variable from a normal programming language variable. "Q" represents, in the perspective of our pseudocode examples, the name of a source DtdElement. In general, two more parts could be usefully added to this notation: an index to the DtdPath of the intended DtdElement to distinguish this Reference from References to other DtdElements with the same name; and an index to the Bprogram encoding selection criteria to disambiguate the DtdElement (in this case no index is necessary because this Reference is inside the disambiguating Bprogram. These parts have been suppressed in order reduce clutter in the example.

In this particular example, however, the user has entered into the selection criteria another ambiguous element. Element U (1120) is ambiguous because it has a repeating ancestor, element S (1116). In this example, therefore, the mapping application is programmed to prompt (1132) the user to enter selection criteria for element U. The user enters the expression at reference (1134):

$(SRC::T).equals($(SRC::N));

This example expression is Java for logical equality of the values of the elements T (1118) and N (1108) viewed as strings. Neither T nor N is ambiguous in this context. Disambiguating P by entering selection criteria for it also disambiguated all the ambiguous elements in the source tree above P, and, for that matter, on the same level as P for elements descending from ancestors of P below the source root (1104). Disambiguating P therefore disambiguated element N (1102). Similarly, disambiguating U (1120) also disambiguated T (1118). At this point, therefore, having no more ambiguous elements referenced in disambiguating selection criteria, the process of recursive disambiguation is complete.

Figure 12:
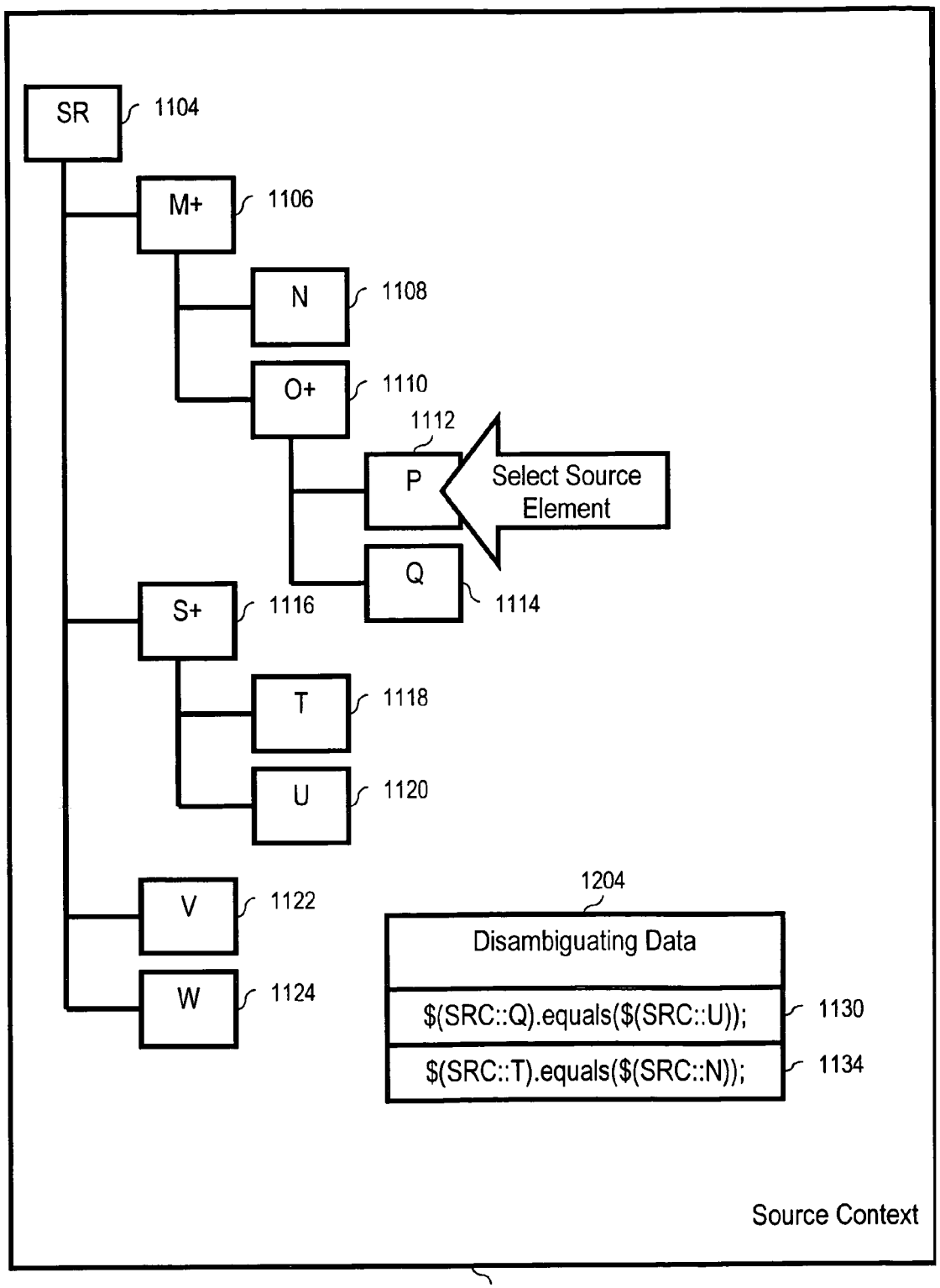
FIG. 12 illustrates results of recursive disambiguation in a source context for an exemplary use case.

FIG. 12 shows the result, a context (1202) in which the selected element P (1112) is unambiguous, plus indications of ambiguity status for the tree in which no elements are presently ambiguous, plus the disambiguating data (1204). The disambiguating data in this case is the selection criteria (references 1130, 1134):

$(SRC::Q).equals($(SRC::U));
$(SRC::T).equals($(SRC::N));

In response to the user's selection of and disambiguation of source node P (1112) for mapping to target node D (812 on FIG. 10), the mapping application generates the following rule:

In converting a source XML document to a target XML document, read a source element.
if(the name of the source element is P, and, at this point in conversion processing,
the value of element Q is equal to the value of element U, and
the value of element T is equal to the value of element N)
then write the value of source element P into a target element named D.

It will be understood from the foregoing description that various modifications and changes may be made, and in fact will be made, in the exemplary embodiments of the present invention without departing from its true spirit. The descriptions in this specification are for purposes of illustration only and are not to be construed in a limiting sense. The scope of the present invention is limited only by the language of the following claims.

What is claimed is:

1. A method for graphical specification of an XML to XML transformation rule, the method comprising the steps of:
  receiving a user's selection of a user-selected, optionally ambiguous, target leaf node, from a target tree of an initial target context, the target leaf node representing a target XML element to be mapped by the transformation rule;
  if the target leaf node is ambiguous, disambiguating the target leaf node;
  adding the target leaf node to the transformation rule;
  receiving a user's selection of at least one user-selected, optionally ambiguous, source leaf node, from a source tree of an initial source context, wherein the source leaf node represents a source XML element to be mapped to the target leaf node by the transformation rule;
  if the source leaf node is ambiguous, disambiguating the source leaf node; and
  adding the user-selected source leaf node to the transformation rule.

2. The method of claim 1 wherein the source leaf node is ambiguous, and disambiguating the source leaf node further comprises:
  creating a new source context for the selected source leaf node;
  adding to the new source context and to the transformation rule a user-specified selection criterion for the first source node, wherein the selection criterion for the first source node optionally recursively includes one or more additional ambiguous source nodes;
  recursively creating additional new contexts for the additional ambiguous source nodes; and
  recursively adding to the additional new contexts and to the transformation rule user-specified selection criteria for the additional ambiguous source nodes.

3. The method of claim 1 wherein:
  the target leaf node is ambiguous,
  receiving a user's selection of the target leaf node further comprising receiving a user's selection of the target leaf node, from a target tree of an initial target context, the target leaf node representing a target XML element to be mapped by the transformation rule, the target tree having a root, the target leaf node having a path from the root to the target leaf node, excluding the target leaf node itself, wherein the path includes one or more repeating nodes, and
  disambiguating the target leaf node further comprises:
  creating a new context for each repeating node in the tree path between the root and the target leaf node;
  adding, to each new context and to the transformation rule, for each repeating node in the tree path between the root and the target leaf node, a user-specified indication whether each such repeating node represents an XML element mapped with multiple instances; and
  adding, to each new context and to the transformation rule, a user-selected repeating source node for each repeating node in the tree path between the root and the target leaf node that represents an XML element mapped with multiple instances.

4. The method of claim 1 wherein:
  the target leaf node is ambiguous,
  receiving a user's selection of the target leaf node further comprising receiving a user's selection of the target leaf node, from a target tree of an initial target context, the target leaf node representing a target XML element to be mapped by the transformation rule, the target tree having a root, the target leaf node having a path from the root to the target leaf node excluding the target leaf node itself, wherein the path includes one or more repeating nodes, and
  disambiguating the target leaf node further comprises:
  selecting, from among previously-created contexts, a selected context for at least one repeating node in the tree path between the root and the target leaf node;
  adding, to each selected context and to the transformation rule, for the at least one repeating node in the tree path between the root and the target leaf node, a user-specified indication whether each such repeating node represents an XML element mapped with multiple instances; and
  if the at least one repeating node represents an XML element mapped with multiple instances, adding, to each selected context and to the transformation rule, a user-selected repeating source node for the at least one repeating node.

5. A method for graphical specification of an XML to XML transformation rule, the method comprising the steps of:
  receiving a user's selection of a user-selected, ambiguous, target leaf node, from a target tree of an initial target context, the target leaf node representing a target XML element to be mapped by the transformation rule, the target tree having a root, the target leaf node having a path from the root to the target leaf node including the target leaf node itself, wherein the path includes one or more repeating nodes;

disambiguating the target leaf node, further comprising:
creating a new context for each repeating node in the tree path between the root and the target leaf node;
adding, to each new context and to the transformation rule, for each repeating node in the tree path between the root and the target leaf node, a user-specified indication whether each such repeating node represents an XML element mapped with multiple instances; and
adding, to each new context and to the transformation rule, a user-selected repeating source node for each repeating node in the tree path between the root and the target leaf node that represents an XML element mapped with multiple instances; and
adding the target leaf node to the transformation rule.

6. The method of claim 5 wherein disambiguating the target leaf node, further comprises:
selecting, from among previously-created contexts, a selected context for at least one repeating node in the tree path between the root and the target leaf node;
adding, to the selected context and to the transformation rule, for the at least one repeating node in the tree path between the root and the target leaf node, a user-specified indication whether each such repeating node represents an XML element mapped with multiple instances; and
if the at least one repeating node represents an XML element mapped with multiple instances, adding, to the selected context and to the transformation rule, a user-selected repeating source node for the at least one repeating node.

7. The method of claim 5 wherein at least one of the user-selected repeating source nodes is an ambiguous repeating source node having at least one repeating ancestor node, and adding a user-selected repeating source node for each repeating node in the tree path further comprises:
creating a new source context for the selected source leaf node;
adding, to the new source context and to the transformation rule, a user-specified selection criterion for the first source node, wherein the selection criterion for the first source node optionally recursively includes one or more additional ambiguous source nodes;
recursively creating additional new contexts for the additional ambiguous source nodes; and
recursively adding, to the additional new contexts and to the transformation rule, user-specified selection criteria for the additional ambiguous source nodes.

8. A system for graphical specification of an XML to XML transformation rule, the system comprising:
means for receiving a user's selection of a user-selected, optionally ambiguous, target leaf node, from a target tree of an initial target context, the target leaf node representing a target XML element to be mapped by the transformation rule;
means for disambiguating the target leaf node if the target leaf node is ambiguous;
means for adding the target leaf node to the transformation rule;
means for receiving a user's selection of at least one user-selected, optionally ambiguous, source leaf node, from a source tree of an initial source context, wherein the source leaf node represents a source XML element to be mapped to the target leaf node by the transformation rule;
means for disambiguating the source leaf node if the source leaf node is ambiguous; and
means for adding the user-selected source leaf node to the transformation rule.

9. The system of claim 8 wherein the source leaf node is ambiguous, and means for disambiguating the source leaf node further comprises:
means for creating a new source context for the selected source leaf node;
means for adding to the new source context and to the transformation rule a user-specified selection criterion for the first source node, wherein the selection criterion for the first source node optionally recursively includes one or more additional ambiguous source nodes;
means for recursively creating additional new contexts for the additional ambiguous source nodes; and
means for recursively adding to the additional new contexts and to the transformation rule user-specified selection criteria for the additional ambiguous source nodes.

10. The system of claim 8 wherein:
the target leaf node is ambiguous,
means for receiving a user's selection of the target leaf node further comprising means for receiving a user's selection of the target leaf node, from a target tree of an initial target context, the target leaf node representing a target XML element to be mapped by the transformation rule, the target tree having a root, the target leaf node having a path from the root to the target leaf node, excluding the target leaf node itself, wherein the path includes one or more repeating nodes, and
means for disambiguating the target leaf node further comprises:
means for creating a new context for each repeating node in the tree path between the root and the target leaf node;
means for adding, to each new context and to the transformation rule, for each repeating node in the tree path between the root and the target leaf node, a user-specified indication whether each such repeating node represents an XML element mapped with multiple instances; and
means for adding, to each new context and to the transformation rule, a user-selected repeating source node for each repeating node in the tree path between the root and the target leaf node that represents an XML element mapped with multiple instances.

11. The system of claim 8 wherein:
the target leaf node is ambiguous,
means for receiving a user's selection of the target leaf node further comprising means for receiving a user's selection of the target leaf node, from a target tree of an initial target context, the target leaf node representing a target XML element to be mapped by the transformation rule, the target tree having a root, the target leaf node having a path from the root to the target leaf node excluding the target leaf node itself, wherein the path includes one or more repeating nodes, and
means for disambiguating the target leaf node further comprises:
means for selecting, from among previously-created contexts, a selected context for at least one repeating node in the tree path between the root and the target leaf node;

means for adding, to each selected context and to the transformation rule, for the at least one repeating node in the tree path between the root and the target leaf node, a user-specified indication whether each such repeating node represents an XML element mapped with multiple instances; and means for adding, to each selected context and to the transformation rule, a user-selected repeating source node for the at least one repeating node if the at least one repeating node represents an XML element mapped with multiple instances.

12. A system for graphical specification of an XML to XML transformation rule, the system comprising:

means for receiving a user's selection of a user-selected, ambiguous, target leaf node, from a target tree of an initial target context, the target leaf node representing a target XML element to be mapped by the transformation rule, the target tree having a root, the target leaf node having a path from the root to the target leaf node including the target leaf node itself, wherein the path includes one or more repeating nodes;

means for disambiguating the target leaf node, further comprising:

means for creating a new context for each repeating node in the tree path between the root and the target leaf node;

means for adding, to each new context and to the transformation rule, for each repeating node in the tree path between the root and the target leaf node, a user-specified indication whether each such repeating node represents an XML element mapped with multiple instances; and means for adding, to each new context and to the transformation rule, a user-selected repeating source node for each repeating node in the tree path between the root and the target leaf node that represents an XML element mapped with multiple instances; and means for adding the target leaf node to the transformation rule.

13. The system of claim 12 wherein means for disambiguating the target leaf node, further comprises:

means for selecting, from among previously-created contexts, a selected context for at least one repeating node in the tree path between the root and the target leaf node;

means for adding, to the selected context and to the transformation rule, for the at least one repeating node in the tree path between the root and the target leaf node, a user-specified indication whether each such repeating node represents an XML element mapped with multiple instances; and means for adding, to the selected context and to the transformation rule, a user-selected repeating source node for the at least one repeating node if the at least one repeating node represents an XML element mapped with multiple instances.

14. The system of claim 12 wherein at least one of the user-selected repeating source nodes is an ambiguous repeating source node having at least one repeating ancestor node, and means for adding a user-selected repeating source node for each repeating node in the tree path further comprises:

means for creating a new source context for the selected source leaf node;

means for adding, to the new source context and to the transformation rule, a user-specified selection criterion for the first source node, wherein the selection criterion for the first source node optionally recursively includes one or more additional ambiguous source nodes;

means for recursively creating additional new contexts for the additional ambiguous source nodes; and means for recursively adding, to the additional new contexts and to the transformation rule, user-specified selection criteria for the additional ambiguous source nodes.

15. A computer program product for graphical specification of an XML to XML transformation rule, the computer program product comprising:

a recording medium;

means, recorded on the recording medium, for receiving a user's selection of a user-selected, optionally ambiguous, target leaf node, from a target tree of an initial target context, the target leaf node representing a target XML element to be mapped by the transformation rule;

means, recorded on the recording medium, for disambiguating the target leaf node if the target leaf node is ambiguous;

means, recorded on the recording medium, for adding the target leaf node to the transformation rule;

means, recorded on the recording medium, for receiving a user's selection of at least one user-selected, optionally ambiguous, source leaf node, from a source tree of an initial source context, wherein the source leaf node represents a source XML element to be mapped to the target leaf node by the transformation rule;

means, recorded on the recording medium, for disambiguating the source leaf node if the source leaf node is ambiguous; and means, recorded on the recording medium, for adding the user-selected source leaf node to the transformation rule.

16. The computer program product of claim 15 wherein the source leaf node is ambiguous, and means, recorded on the recording medium, for disambiguating the source leaf node further comprises:

means, recorded on the recording medium, for creating a new source context for the selected source leaf node;

means, recorded on the recording medium, for adding to the new source context and to the transformation rule a user-specified selection criterion for the first source node, wherein the selection criterion for the first source node optionally recursively includes one or more additional ambiguous source nodes;

means, recorded on the recording medium, for recursively creating additional new contexts for the additional ambiguous source nodes; and means, recorded on the recording medium, for recursively adding to the additional new contexts and to the transformation rule user-specified selection criteria for the additional ambiguous source nodes.

17. The computer program product of claim 15 wherein:

the target leaf node is ambiguous, means, recorded on the recording medium, for receiving a user's selection of the target leaf node further comprising means for receiving a user's selection of the target leaf node, from a target tree of an initial target context, the target leaf node representing a target XML element to be mapped by the transformation rule, the target tree having a root, the target leaf node having a path from the root to the target leaf node, excluding the target leaf node itself, wherein the path includes one or more repeating nodes, and means, recorded on the recording medium, for disambiguating the target leaf node further comprises:

means, recorded on the recording medium, for creating a new context for each repeating node in the tree path between the root and the target leaf node;

means, recorded on the recording medium, for adding, to each new context and to the transformation rule, for each repeating node in the tree path between the root and the target leaf node, a user-specified indication whether each such repeating node represents an XML element mapped with multiple instances; and means, recorded on the recording medium, for adding, to each new context and to the transformation rule, a user-selected repeating source node for each repeating node in the tree path between the root and the target leaf node that represents an XML element mapped with multiple instances.

18. The computer program product of claim 15 wherein:

the target leaf node is ambiguous, means, recorded on the recording medium, for receiving a user's selection of the target leaf node further comprising means for receiving a user's selection of the target leaf node, from a target tree of an initial target context, the target leaf node representing a target XML element to be mapped by the transformation rule, the target tree having a root, the target leaf node having a path from the root to the target leaf node excluding the target leaf node itself, wherein the path includes one or more repeating nodes, and means, recorded on the recording medium, for disambiguating the target leaf node further comprises:

means, recorded on the recording medium, for selecting, from among previously-created contexts, a selected context for at least one repeating node in the tree path between the root and the target leaf node;

means, recorded on the recording medium, for adding, to each selected context and to the transformation rule, for the at least one repeating node in the tree path between the root and the target leaf node, a user-specified indication whether each such repeating node represents an XML element mapped with multiple instances; and means, recorded on the recording medium, for adding, to each selected context and to the transformation rule, a user-selected repeating source node for the at least one repeating node if the at least one repeating node represents an XML element mapped with multiple instances.

19. A computer program product for graphical specification of an XML to XML transformation rule, the computer program product comprising:

a recording medium;

means, recorded on the recording medium, for receiving a user's selection of a user-selected, ambiguous, target leaf node, from a target tree of an initial target context, the target leaf node representing a target XML element to be mapped by the transformation rule, the target tree having a root, the target leaf node having a path from the root to the target leaf node including the target leaf node itself, wherein the path includes one or more repeating nodes;

means, recorded on the recording medium, for disambiguating the target leaf node, further comprising:

means, recorded on the recording medium, for creating a new context for each repeating node in the tree path between the root and the target leaf node;

means, recorded on the recording medium, for adding, to each new context and to the transformation rule, for each repeating node in the tree path between the root and the target leaf node, a user-specified indication whether each such repeating node represents an XML element mapped with multiple instances; and means, recorded on the recording medium, for adding, to each new context and to the transformation rule, a user-selected repeating source node for each repeating node in the tree path between the root and the target leaf node that represents an XML element mapped with multiple instances; and means, recorded on the recording medium, for adding the target leaf node to the transformation rule.

20. The computer program product of claim 19 wherein means, recorded on the recording medium, for disambiguating the target leaf node, further comprises:

means, recorded on the recording medium, for selecting, from among previously-created contexts, a selected context for at least one repeating node in the tree path between the root and the target leaf node;

means, recorded on the recording medium, for adding, to the selected context and to the transformation rule, for the at least one repeating node in the tree path between the root and the target leaf node, a user-specified indication whether each such repeating node represents an XML element mapped with multiple instances; and means, recorded on the recording medium, for adding, to the selected context and to the transformation rule, a user-selected repeating source node for the at least one repeating node if the at least one repeating node represents an XML element mapped with multiple instances.

21. The computer program product of claim 19 wherein at least one of the user-selected repeating source nodes is an ambiguous repeating source node having at least one repeating ancestor node, and means, recorded on the recording medium, for adding a user-selected repeating source node for each repeating node in the tree path further comprises:

means, recorded on the recording medium, for creating a new source context for the selected source leaf node;

means, recorded on the recording medium, for adding, to the new source context and to the transformation rule, a user-specified selection criterion for the first source node, wherein the selection criterion for the first source node optionally recursively includes one or more additional ambiguous source nodes;

means, recorded on the recording medium, for recursively creating additional new contexts for the additional ambiguous source nodes; and means for recursively adding, to the additional new contexts and to the transformation rule, user-specified selection criteria for the additional ambiguous source nodes.

* * * * *